United States Patent
Liu et al.

(10) Patent No.: US 11,435,545 B2
(45) Date of Patent: *Sep. 6, 2022

(54) CAMERA LENS MODULE AND MANUFACTURING METHOD THEREOF

(71) Applicant: NINGBO SUNNY OPOTECH CO., LTD., Zhejiang (CN)

(72) Inventors: Chunmei Liu, Zhejiang (CN); Yiqi Wang, Zhejiang (CN); Liang Ding, Zhejiang (CN); Mingzhu Wang, Zhejiang (CN); Hailong Liao, Zhejiang (CN); Nan Guo, Zhejiang (CN)

(73) Assignee: NINGBO SUNNY OPOTECH CO., LTD., Zhejiang (CN)

( * ) Notice: Subject to any disclaimer, the term of this patent is extended or adjusted under 35 U.S.C. 154(b) by 0 days.

This patent is subject to a terminal disclaimer.

(21) Appl. No.: 16/908,399

(22) Filed: Jun. 22, 2020

(65) Prior Publication Data

US 2020/0319423 A1    Oct. 8, 2020

Related U.S. Application Data

(63) Continuation of application No. 15/964,896, filed on Apr. 27, 2018, now Pat. No. 10,732,376, which is a
(Continued)

(30) Foreign Application Priority Data

Dec. 2, 2015    (CN) .......................... 201510873602.2

(51) Int. Cl.
*G02B 7/00*    (2021.01)
*H04N 5/225*    (2006.01)
(Continued)

(52) U.S. Cl.
CPC ............... *G02B 7/003* (2013.01); *G02B 7/02* (2013.01); *G02B 7/021* (2013.01); *G02B 7/023* (2013.01);
(Continued)

(58) Field of Classification Search
CPC .... G02B 7/003; G02B 7/025; G02B 13/0045; G02B 7/023; G02B 7/021; G02B 7/02;
(Continued)

(56) References Cited

U.S. PATENT DOCUMENTS 8,260,129 B2 * 9/2012 Craen ............... H01L 27/14618
396/72
8,854,527 B2    10/2014 Afshari
(Continued)

FOREIGN PATENT DOCUMENTS

CN    1332382 A    1/2002
CN    1588154 A    3/2005
(Continued)

*Primary Examiner* — Abdelaaziz Tissire
(74) *Attorney, Agent, or Firm* — Sughrue Mion, PLLC

(57) ABSTRACT

A camera lens module includes a lens assembly. The lens assembly may comprise a first optical lens module comprising a first carrier and at least one first optical lens received in the first carrier; and a second optical lens module comprising a second carrier, at least one second optical lens received in the second carrier, and a bearing portion connected to the second carrier. When the first optical lens module and the second optical lens module are assembled together, an adjustable clearance exists between the first carrier and the bearing portion, and between bottom surfaces of the first carrier and a lowermost lens of the first optical lenses and a top surface of an uppermost lens of the second optical lenses.

23 Claims, 19 Drawing Sheets

Related U.S. Application Data continuation-in-part of application No. 15/057,050, filed on Feb. 29, 2016, now Pat. No. 10,302,892, which is a continuation of application No. 15/057,048, filed on Feb. 29, 2016, now Pat. No. 10,228,532.

(51) Int. Cl.
*G02B 7/02* (2021.01)
*H04N 17/00* (2006.01)
*G02B 13/00* (2006.01)

(52) U.S. Cl.
CPC ......... *G02B 7/025* (2013.01); *G02B 13/0045* (2013.01); *H04N 5/2253* (2013.01); *H04N 5/2254* (2013.01); *H04N 5/2257* (2013.01); *H04N 17/002* (2013.01)

(58) Field of Classification Search
CPC .. H04N 5/2257; H04N 17/002; H04N 5/2254; H04N 5/2253
See application file for complete search history.

(56) References Cited

U.S. PATENT DOCUMENTS

| | | | |
|---|---|---|---|
| 10,732,376 B2* | 8/2020 | Wang | H04N 5/2253 |
| 2001/0040737 A1 | 11/2001 | Nakano | |
| 2002/0071190 A1 | 6/2002 | Wada et al. | |
| 2003/0057426 A1 | 3/2003 | Miyazaki et al. | |
| 2004/0105173 A1 | 6/2004 | Yamaguchi et al. | |
| 2004/0109243 A1 | 6/2004 | Orimo et al. | |
| 2004/0252195 A1* | 12/2004 | Lu | G03B 43/00 348/188 |
| 2005/0237415 A1 | 10/2005 | Kong et al. | |
| 2006/0028742 A1* | 2/2006 | Yamashita | G02B 7/08 359/819 |
| 2006/0061885 A1* | 3/2006 | Ito | G02B 13/009 359/811 |
| 2006/0087751 A1* | 4/2006 | Liu | G02B 7/025 359/819 |
| 2006/0192230 A1 | 8/2006 | Wood et al. | |
| 2007/0047938 A1* | 3/2007 | Suzuki | G02B 7/08 396/89 |
| 2007/0115375 A1* | 5/2007 | Yu | H04N 5/2254 348/240.99 |
| 2007/0291982 A1 | 12/2007 | Sung et al. | |
| 2007/0292127 A1* | 12/2007 | Kuhmann | H01L 27/14625 396/529 |
| 2008/0100934 A1 | 5/2008 | Webster et al. | |
| 2008/0151098 A1* | 6/2008 | Yu | H04N 5/2254 348/374 |
| 2008/0151396 A1 | 6/2008 | Chiang | |
| 2008/0267603 A1* | 10/2008 | Jung | G02B 7/021 396/111 |
| 2009/0015706 A1 | 1/2009 | Singh | |
| 2009/0085138 A1* | 4/2009 | Ryu | H01L 27/14618 257/434 |
| 2009/0167880 A1 | 7/2009 | Yang et al. | |
| 2009/0185296 A1 | 7/2009 | Huang et al. | |
| 2010/0247086 A1* | 9/2010 | Tallaron | G02B 13/004 396/133 |
| 2010/0265597 A1 | 10/2010 | Shyu | |
| 2011/0026144 A1 | 2/2011 | Shyu et al. | |
| 2011/0032410 A1 | 2/2011 | Shigemitsu et al. | |
| 2011/0058265 A1* | 3/2011 | Chang | G02B 13/004 359/793 |
| 2011/0063739 A1* | 3/2011 | Hirata | G02B 7/023 359/819 |
| 2011/0069198 A1 | 3/2011 | Ezawa et al. | |
| 2011/0285890 A1* | 11/2011 | Choi | H04N 5/2257 348/308 |
| 2012/0188635 A1 | 7/2012 | Kubala et al. | |
| 2012/0224094 A1 | 9/2012 | Lee et al. | |
| 2012/0294602 A1* | 11/2012 | Sekine | G02B 7/08 396/502 |
| 2013/0063655 A1 | 3/2013 | Hsu | |
| 2013/0235250 A1 | 9/2013 | Fainstain | |
| 2013/0242182 A1 | 9/2013 | Rudmann et al. | |
| 2013/0308047 A1 | 11/2013 | Chen et al. | |
| 2013/0308212 A1 | 11/2013 | Kubala et al. | |
| 2014/0028905 A1 | 1/2014 | Kim | |
| 2014/0043524 A1 | 2/2014 | Azuma et al. | |
| 2014/0125849 A1 | 5/2014 | Heimgartner et al. | |
| 2015/0062422 A1 | 3/2015 | Stern | |
| 2015/0172521 A1 | 6/2015 | Yasukochi et al. | |
| 2015/0174715 A1 | 6/2015 | Kang | |
| 2015/0260942 A1 | 9/2015 | Yan et al. | |
| 2015/0293330 A1* | 10/2015 | Gutierrez | G03B 43/00 359/811 |
| 2015/0301303 A1* | 10/2015 | Kim | B32B 37/142 348/373 |
| 2016/0282580 A1 | 9/2016 | Koyama et al. | |
| 2017/0108699 A1 | 4/2017 | Perez Calero et al. | |
| 2017/0163856 A1 | 6/2017 | Wang et al. | |
| 2018/0106978 A1 | 4/2018 | Wang et al. | |
| 2018/0164531 A1 | 6/2018 | Wei | |
| 2018/0210320 A1 | 7/2018 | Park et al. | |
| 2018/0224623 A1* | 8/2018 | Lin | G02B 7/021 |
| 2019/0049693 A1 | 2/2019 | Wang | |
| 2019/0079261 A1 | 3/2019 | Wang | |

FOREIGN PATENT DOCUMENTS

| | | |
|---|---|---|
| CN | 1704786 A | 12/2005 |
| CN | 101105563 A | 1/2008 |
| CN | 101144883 A | 3/2008 |
| CN | 101170117 A | 4/2008 |
| CN | 201344989 Y | 11/2009 |
| CN | 201373936 Y | 12/2009 |
| CN | 101907758 A | 12/2010 |
| CN | 101995633 A | 3/2011 |
| CN | 102023361 A | 4/2011 |
| CN | 102576140 A | 7/2012 |
| CN | 202472093 U | 10/2012 |
| CN | 102789111 A | 11/2012 |
| CN | 103066080 A | 4/2013 |
| CN | 103201665 A | 7/2013 |
| CN | 103246039 A | 8/2013 |
| CN | 203133370 U | 8/2013 |
| CN | 103314568 A | 9/2013 |
| CN | 103424836 A | 12/2013 |
| CN | 203912057 U | 10/2014 |
| CN | 204168381 U | 2/2015 |
| CN | 204203536 U | 3/2015 |
| CN | 104735313 A | 6/2015 |
| CN | 105093469 A | 11/2015 |
| CN | 105445885 A | 3/2016 |
| EP | 2081391 | 7/2009 |
| EP | 2498112 | 9/2012 |
| JP | 3-129307 A | 6/1991 |
| JP | 2004-163865 A | 6/2004 |
| JP | 2006-308987 A | 11/2006 |
| JP | 2007187776 | 7/2007 |
| JP | 2009-25591 A | 2/2009 |
| KR | 10-2007-0009151 A | 1/2007 |
| KR | 20140069803 | 6/2014 |
| KR | 10-2014-0131771 A | 11/2014 |
| TW | I471627 B | 2/2015 |
| WO | 2015016586 | 2/2015 |
| WO | 2015040903 | 3/2015 |

* cited by examiner

CAMERA LENS MODULE AND MANUFACTURING METHOD THEREOF

CROSS REFERENCE

This is a continuation of application Ser. No. 15/964,896, filed Apr. 27, 2018, which is a Continuation-In-Part of application Ser. No. 15/057,050 filed Feb. 29, 2016, which is a Continuation of application Ser. No. 15/057,048 filed Feb. 29, 2016, which claims priority from Chinese Application No. 201510873602.2, filed Dec. 2, 2015, the contents of which are hereby incorporated by reference into this application.

BACKGROUND OF THE PRESENT INVENTION

Field of Invention

The present invention relates to photographic cameras, and more particularly to a lens assembly, a camera lens module and an electronic device.

Description of Related Arts

With the rapid development of mobile communication technologies, camera modules have become a standardized equipment for electronic apparatus such as smart phones, portable computers, tablet computers, televisions, vehicle monitoring systems, and surveillance systems. Accordingly, the camera module has been rapidly developed toward major concerns of how to improve the production yield and efficiency, how to reduce the cost, and how to improve the image capturing quality. An existing camera module generally comprises a circuit board, a light sensor chip, a lens base, a driver unit, a lens, and other major components being assembled together, wherein the resolution of the camera module can achieve through the image quality control by the circuit board, the light sensor chip, the lens and the driver unit, the tolerance of the structural configuration of the components, and the tolerance of the assembling configuration of the components.

Within all major components of the camera module, the camera lens is the most important factor to affect the image resolution. Under normal circumstances, the camera module is configured to include one or more lenses in an individual lens assembly. In particular, the camera lens comprises a lens barrel to support a plurality of lenses therein to provide a dark environment therefor, wherein two or more lens barrels are assembled together to correlatively link the lenses form an integral optical system. Then, the optical system is assembled to the lens base or the driver unit. Through the assembling process, assembly errors may cause the lens eccentrically or tiltedly aligned with the light sensor chip, so as to reduce the resolution of the camera module. Furthermore, the tolerance of each lens related to its optical ability and the tolerance of each lens to be mounted in the lens barrel should take into account of the conventional assembling process. Even though the quality of each lens can be guaranteed and each lens can be precisely installed into the lens barrel, the tolerance of assembling the lens barrels together will also take into account of the conventional assembling process. It is because the assembling tolerance of the lens assembly cannot be corrected once the lens barrels are assembled. In other words, these tolerances will reduce the optical quality of the lens assembly and affect the productivity and image quality of the lens assembly.

Therefore, there is a demand for improving the existing assembling process of the lens assembly to ensure the image quality thereof.

SUMMARY OF THE PRESENT INVENTION

The invention is advantageous in that it provides a camera lens module with one or more optical lens modules and a manufacturing method thereof, which can eliminate the defects of the conventional camera lens module during the assembling process. The assembling process and the calibration process can be integrated into the manufacturing process to ensure the image quality of the camera lens module.

Another advantage of the invention is to a camera lens module with one or more optical lens modules and a manufacturing method thereof, wherein the position adjustment and the calibration are completed before the final assembling of the camera lens to simplify the assembling steps of the camera lens module, to highly increase the production efficiency of the camera lens module, and to reduce the manufacturing cost of the camera lens module.

Another advantage of the invention is to a camera lens module with one or more optical lens modules and a manufacturing method thereof, wherein the calibration of the camera lens module is based on the image quality thereof to adjust the relative position of the lens barrel so as to ensure the higher product yield of the camera lens module.

Another advantage of the invention is to a camera lens module with one or more optical lens modules and a manufacturing method thereof, wherein the camera lens module comprises a plurality of optical lens modules, each comprising at least one optical lens supported in a lens barrel. The relative position of each optical lens modules is adjustable to ensure the corrected alignment of the optical lens module so as to ensure the optical quality of the camera lens module.

Another advantage of the invention is to a camera lens module and a manufacturing method thereof, wherein the calibration of the camera lens module with one or more optical lens modules is to adjust the relative positions of the optical lens modules to compensate the unavoidable tolerance of the camera lens module so as to minimize the optical defect of camera lens module and to enhance the production efficiency while being cost effective.

Another advantage of the invention is to a camera lens module with one or more optical lens modules and a manufacturing method thereof, the relative position of the optical lens module is permanently fixed once the calibration thereof is completed to minimize the assembling steps of the camera lens module while being cost effective.

Another advantage of the invention is to a camera lens module with one or more optical lens modules and a manufacturing method thereof, wherein the structural configuration of the camera lens module is compact to reduce the overall size thereof.

Another advantage of the invention is to a camera lens module with one or more optical lens modules and a manufacturing method thereof, wherein the relative position of the optical lens module is adjustable with respect to as many as six axes X, Y, Z, U, V, and W thereof.

Another advantage of the invention is to a camera lens module with one or more optical lens modules and a manufacturing method thereof, wherein each optical element to be calibrated can be selectively adjusted at different orientations to speed up the calibration process and to ensure the image quality and precise assembly of the camera lens module.

Another advantage of the invention is to a camera lens module with one or more optical lens modules and a manufacturing method thereof, which can minimize the existing assembling tolerances through the conventional assembling method of the camera lens module so as to reduce the defect of the camera lens module due to the conventional assembling method.

Another advantage of the invention is to a camera lens module with one or more optical lens modules and a manufacturing method thereof, wherein the relative position of at least one of the optical lens module is adjustable to ensure the image quality of the camera lens module.

Another advantage of the invention is to a camera lens module with one or more optical lens modules and a manufacturing method thereof, wherein each optical element to be calibrated is calibrated and adjusted for achieving the acquired image quality of the camera lens module before the relative position of the optical element to be calibrated is fixed.

Another advantage of the invention is to a camera lens module with one or more optical lens modules and a manufacturing method thereof, the calibration process can apply to adjust the relative position of the optical lens, the relative position of the optical lens module, and the relative position of the aperture member. Therefore, the calibration process can be selectively applied any combination of different optical element to be calibrated optical elements to be calibrated to ensure the image quality of the camera lens module.

Additional advantages and features of the invention will become apparent from the description which follows, and may be realized by means of the instrumentalities and combinations particular point out in the appended claims.

According to the present invention, the foregoing and other objects and advantages are attained by a camera lens module, comprising:

an image sensor having a photosensitive path; and a lens assembly, which comprises an optical lens set, a lens barrel set, and an aperture member, wherein the optical lens set comprises at least one optical lens, wherein the lens barrel set comprises at least one lens barrel, wherein the optical lens is supported within the lens barrel along a height direction thereof to form at least an optical lens module, wherein the aperture member is coupled at a distal edge of the optical lens module, wherein the optical lens module is coupled at the image sensor along the photosensitive path thereof, wherein an assembling position of at least one of the optical lens modules is adjustable with respect to the position of the image sensor.

In one embodiment, the lens assembly comprises two or more optical lens modules, wherein two adjacent optical lens modules are pre-assembled such that the assembling position of each of the optical lens modules is adjustable with respect to the position of the image sensor.

In one embodiment, the relative position of the optical lens module is adjustable with respect to as many as the six axes X, Y, Z, U, V, and W of the camera lens module.

In one embodiment, at least one of the lenses of the optical lens modules is pre-assembled in the respective lens barrel while the assembling position of the pre-assembled lens is arranged to be adjustable with respect to the position of the image sensor.

In particular, the optical lens is arranged movable within the lens barrel to selectively adjust the assembling position of the optical lens within the lens barrel in at least one direction.

In one embodiment, a calibration channel is formed at a barrel wall of the lens barrel communicating an interior thereof with outside and is aligned with respect to the optical lens pre-assembled within the lens barrel, such that the assembling position of the optical lens within the lens barrel can be adjusted through the calibration channel.

In one embodiment, the aperture member is coupled at the top portion of the optical lens module, wherein the relative position of the aperture member with respect to the optical lens module is adjustable.

In one embodiment, the relative position of the aperture member with respect to the optical lens module is adjustable in at least one direction.

In one embodiment, the optical element to be calibrated is pre-assembled by the adhering element.

In one embodiment, the adhering element can be a mixture glue comprising UV glue mixed with thermosetting adhesive, wherein the mixture glue is in a semi-solidified state under the UV exposure and is solidified after heat treatment, such as within an oven. Therefore, once the adhering element is solidified, the relative position of the optical element to be calibrated is permanently fixed.

In one embodiment, the image sensor comprises a color filter, a lens base, a photosensitive chip, and a control circuit board, wherein the photosensitive chip is operatively coupled on top of the control circuit board while the color filter and the photosensitive chip are coupled at the lens base. The optical lens module is coupled to the lens base that the relative position of the optical lens module with respect to the lens base is adjustable.

In one embodiment, the camera lens module can be a zoom camera lens module to include a driver unit. The image sensor comprises a color filter, a photosensitive chip, and a control circuit board, wherein the photosensitive chip is operatively coupled on top of the control circuit board while the color filter and the photosensitive chip are coupled at the lens barrel. The driver unit is operatively coupled to the lens barrel.

In one embodiment, the camera lens module is electrified during the pre-assembling process for image acquisition, wherein the calibration measurement including calibration parameter of the optical lens module is determined through the calibration software to ensure the precise position of the optical lens module.

In accordance with another aspect of the invention, the present invention provides a lens assembly which comprises:

an optical lens set comprising at least two optical lenses;

a lens barrel set comprising at least two lens barrels, wherein at least one of the two optical lenses is correspondingly installed within one of the optical barrel, wherein when all the optical lenses are installed in the lens barrels respectively, at least two optical lens modules are formed, wherein the adjacent optical lens modules are pre-assembled while the assembling position between the optical lens modules is adjustable.

In one embodiment, the lens assembly further comprises an aperture member is provided at a distal portion of the optical lens module, wherein the assembling position of the aperture member is adjustable with respect to the position of the optical lens module.

In one embodiment, at least one of the optical lenses is installed in at least one of the lens barrels in such a manner that the assembling position of the pre-assembled optical lens is arranged to be adjustable inside the respective lens barrel.

In one embodiment, the lens barrel receiving the respective pre-assembled optical lens has at least a calibration channel which is provided in a barrel wall of the lens barrel for communicating an interior thereof with outside, wherein the calibration channel is aligned with respect to the optical lens pre-assembled within the lens barrel, such that the assembling position of the optical lens within the lens barrel can be adjusted through the calibration channel.

In one embodiment, the aperture member, the optical lens and the optical lens module are pre-assembled by an adhering element in a semi-solidified manner.

In one embodiment, the adhering element for pre-assemble can be a mixture glue comprising UV glue mixed with thermosetting adhesive, wherein the mixture glue is in a semi-solidified state under the UV exposure and is solidified after heat treatment. Therefore, once the adhering element is solidified, the whole camera lens module is permanently fixed.

In one embodiment, the assembling position of the optical lens within the optical lens module is arranged to be adjustable in at least one direction.

In one embodiment, the assembling position of the aperture member with respect to the top portion of the lens barrel is arranged to be adjustable in at least one direction.

In one embodiment, when the lens assembly is installed within the camera lens module, the relative position of the optical lens module is adjustable with respect to as many as six axes X, Y, Z, U, V, W the of the camera lens module.

In one embodiment, the lens barrel provides at least an optical element to be calibrated therein for supporting at least one optical lens.

In one embodiment, the optical element to be calibrated is formed by a protrusion radially and inwardly extended from an inner barrel wall of the lens barrel.

Accordingly, the present invention further provides a method of assembling the camera lens module, which comprises the following steps.

(A) Pre-assemble optical elements to be calibrated to form the camera lens module in the pre-assembling state.

(B) Acquire the image signal through the optical lens module of the lens assembly.

(C) Determine a calibration measurement such as calibration parameter of the optical lens module of the lens assembly by a calibration software.

(D) Adjust the relative assembling positions of the optical lens module of the lens assembly in response to the calibration measurement.

(E) When the result of the calibration meets a desired resolution, such as relative assembling position of the optical cal lens module of the lens assembly is adjusted to obtain the desired resolution of the camera lens module, executing the step (F), or repeat the steps (B)-(D) when the result of the calibration fails to meet the desired resolution.

(F) Permanently fix the camera lens module, such as solidifying the mixture glue to permanently fix the optical lens module of the lens assembly with the image sensor to form the camera lens module.

In one embodiment, in the step (A), the optical elements to be calibrated include at least one optical lens module which generally comprises at least one optical lens and at least one lens barrel, wherein at least one of the pre-assembled optical lens module is pre-assembled along the photosensitive path of the image sensor, while the assembling position of the pre-assembled optical lens module is arranged to be adjustable with respect to the image sensor.

In one embodiment, in the step (A), the optical elements to be calibrated include at least two optical lens modules which positions are calibrated during assembling process, wherein the optical elements to be calibrated comprises one aperture member which is pre-assembled at the top portion of the optical lens module at the outermost side of the camera lens module and the assembling position of the aperture member is adapted to be adjustable with respect to the relative position of the optical lens module.

In one embodiment, in the step (A), all the optical elements to be calibrated are pre-assembled by means of adhering element which UV glue mixed with thermosetting adhesive, wherein the mixture glue is in a semi-solidified state under UV exposure for pre-assembling. After calibration of the optical elements to be calibrated, in the step (F), the mixture glue is solidified after heat treatment so as to permanently affix the whole camera lens module.

In one embodiment, in the step (A), the camera lens module further comprises a plurality of assembled optical elements which assemble tolerance must be retained within a deviation of acceptable range.

In one embodiment, in the step (B), the pre-assembled camera lens module is electrified to collect images of the camera lens module, wherein the image collection of the camera lens module is based on the capturing of the MTF (Modulation Transfer Function) test target, and the image quality is determined by a MTF value, where the higher MTF value refers to higher image quality. A plurality of MTF value will be determined for every image collected from the camera lens module and will be compared with a predetermined threshold. When the MTF value is greater than or equal to the predetermined threshold, the collection and calibration is completed. When the MTF value is lesser than the predetermined threshold, the image collection is repeated for further calibration.

During each image acquisition process, the camera lens module must be strictly controlled for capturing each image under predetermined environment parameters which includes capturing distance and light source parameters between the MTF test target and the camera lens module to ensure the accuracy and consistency of the image acquisition for ease of the subsequent calibration process.

During the collecting process of collecting images, to the MTF values, the camera lens module should be monitored for eliminating black spot, distortion, and/or shades during the image acquisition process.

In one embodiment, in the step (C), the software used for the calibration of the assembling positions of the optical elements to be calibrated is adapted for the research based on the optical sensitivity of the optical lens components, wherein the software used for computing method of the calibration value of the assembling positions of the optical lens components includes the following steps. (1) Measure the optical characteristics of the camera lens module prior to the calibration, including MTF values, light eccentricity measurement, light axis inclination angle, and curvature of field; and (2) Compute the required calibration value of the assembling positions of the optical element to be calibrated in response to the light eccentricity measurement, light axis inclination angle and the sensitivity of the curvature of field corresponding to the assembling positions of the optical elements to be calibrated.

In one embodiment, in the step (D), the assembling positions of the optical elements to be calibrated with respect to the relative position of the camera lens module is adjusted in at least one direction.

In an embodiment, a lens assembly is disclosed. The lens assembly may comprise a first optical lens module comprising a first carrier and at least one first optical lens received in the first carrier; and a second optical lens module, comprising a second carrier, at least one second optical lens received in the second carrier, and a bearing portion connected to the second carrier, wherein when the first optical lens module and the second optical lens module are assembled together, an adjustable clearance exists between the first carrier and the bearing portion, and between bottom surfaces of the first carrier and a lowermost lens of the first optical lenses and a top surface of an uppermost lens of the second optical lenses.

In an embodiment, an adjustable clearance exists between an outer peripheral surface of the first carrier and an inner peripheral surface of the bearing portion.

In an embodiment, an adjustable clearance exists between a bottom surface of the first carrier and a top surface of the bearing portion.

In an embodiment, an adjustable clearance exists between the bottom surface of the lowermost lens of the first optical lenses and the top surface of the bearing portion of the second optical lens module.

In an embodiment, the first optical lens module further comprises an extension portion extending outward from the first carrier, and an adjustable clearance exists between a bottom surface of the extension portion and a top surface of the bearing portion.

In an embodiment, the first optical lens module comprises at least one spacer ring disposed in cooperation with the first optical lens to provide a predetermined light path, wherein one spacer ring of the at least one spacer ring is disposed at a lower portion of the lowermost lens of the first optical lenses, and an adjustable clearance exists between a bottom surface of the one spacer ring and a top surface of the uppermost lens of the second optical lenses and the bearing portion.

In an embodiment, the second optical lens module comprises at least one spacer ring disposed in cooperation with the second optical lenses to provide a predetermined light path, wherein one spacer ring of the at least one spacer ring is disposed at an upper portion of the uppermost lens of the second optical lenses, and an adjustable clearance exists between the bottom surface of the lowermost lens of the first optical lenses and a top surface of the one spacer ring.

In an embodiment, overall optical properties of the lens assembly are adjusted by means of active calibration, so that the adjustable clearance is formed into a curing clearance.

In an embodiment, the curing clearance is set so that an allowable angle of inclination of the first optical lens module with respect to the second optical lens module is less than or equals to 0.5°.

In an embodiment, the spacer ring is further disposed between two adjacent first optical lenses. The spacer ring is further disposed between two adjacent second optical lenses.

In an embodiment, a bonding medium is accommodated into the clearance between the bottom surface of the extension portion and the top surface of the bearing portion, so that the first optical lens module and the second optical lens module are fixed together.

In an embodiment, the extension portion comprises a projecting portion projecting downward, the bearing portion comprises a matching groove recessed downward, and when the extension portion is laid on the bearing portion, the projecting portion is located inside the matching groove.

In an embodiment, a width of the bonding medium disposed in a radial direction is 0.05 to 1.5 mm and a region of the first carrier corresponding to the bearing portion forms an effective exposure region for the bonding medium, and the exposure region has a width of greater than or equal to 0.1 mm.

In an embodiment, the bonding medium is one or more selected from a group consisting of an UV-cured adhesive, a thermosetting adhesive, an UV-cured thermosetting adhesive, and an epoxy resin adhesive.

In an embodiment, the first carrier of the first optical lens module has a reinforcing and fixing groove, and the reinforcing and fixing groove corresponds to a position of the lowermost lens of the first optical lenses and is used for accommodating a bonding medium to reinforce and fix the lowermost lens.

In an embodiment, the first carrier of the first optical lens module has a reinforcing and fixing region, and the reinforcing and fixing region runs through a side wall of the first carrier and is used for accommodating a bonding medium to reinforce and fix the first optical lens.

In an embodiment, a central axis of the first optical lens module is staggered with respect to a central axis of the second optical lens module by 0 to 15 μm.

In an embodiment, a central axis of the first optical lens module is inclined with respect to a central axis of the second optical lens module by an angle of less than 0.5°.

In an embodiment, when the first optical lens module and the second optical lens module are assembled together, the first optical lens module and the second optical lens module are arranged in sequence along a same optical axis direction.

In an embodiment, when the first optical lens module and the second optical lens module are assembled together, an optical axis direction of the first optical lens module is parallel to an optical axis direction of the second optical lens module.

In an embodiment, at least one of the number of the first optical lens modules and the number of the second optical lens modules is two or more.

In an embodiment, disclosed a camera lens module having a lens assembly, comprising: the lens assembly; and a photosensitive chip, wherein the lens assembly is located in a light path of the photosensitive chip.

In an embodiment, the camera module comprises a driving element, at least one of the optical lens modules of the lens assembly is mounted on the driving element, and the driving element is mounted on the photosensitive chip.

In an embodiment, the photosensitive chip comprises a photosensitive element, a circuit board electrically connected to the photosensitive element, and a lens base mounted on the circuit board and on which the driving element is mounted, to form an autofocus camera module.

In an embodiment, the photosensitive chip comprises a photosensitive element, a circuit board electrically connected to the photosensitive element, and a lens base mounted on the circuit board and on which the lens assembly is mounted, to form a fixed-focus camera module.

In an embodiment, the camera module comprises a filter element mounted on the lens base.

In an embodiment, disclosed an electronic device, comprising: a device body; and the camera lens module, wherein the camera module cooperates with the device body to implement image acquisition and reproduction.

In an embodiment, the electronic device is any one of a smart phone, a wearable device, a computer device, a television, a vehicle, a camera, and a monitoring device.

Still further objects and advantages will become apparent from a consideration of the ensuing description and drawings.

These and other objectives, features, and advantages of the present invention will become apparent from the following detailed description, the accompanying drawings, and the appended claims.

DETAILED DESCRIPTION OF THE PREFERRED EMBODIMENT

The following description is disclosed to enable any person skilled in the art to make and use the present invention. Preferred embodiments are provided in the following description only as examples and modifications will be apparent to those skilled in the art. The general principles defined in the following description would be applied to other embodiments, alternatives, modifications, equivalents, and applications without departing from the spirit and scope of the present invention.

Figure 1:
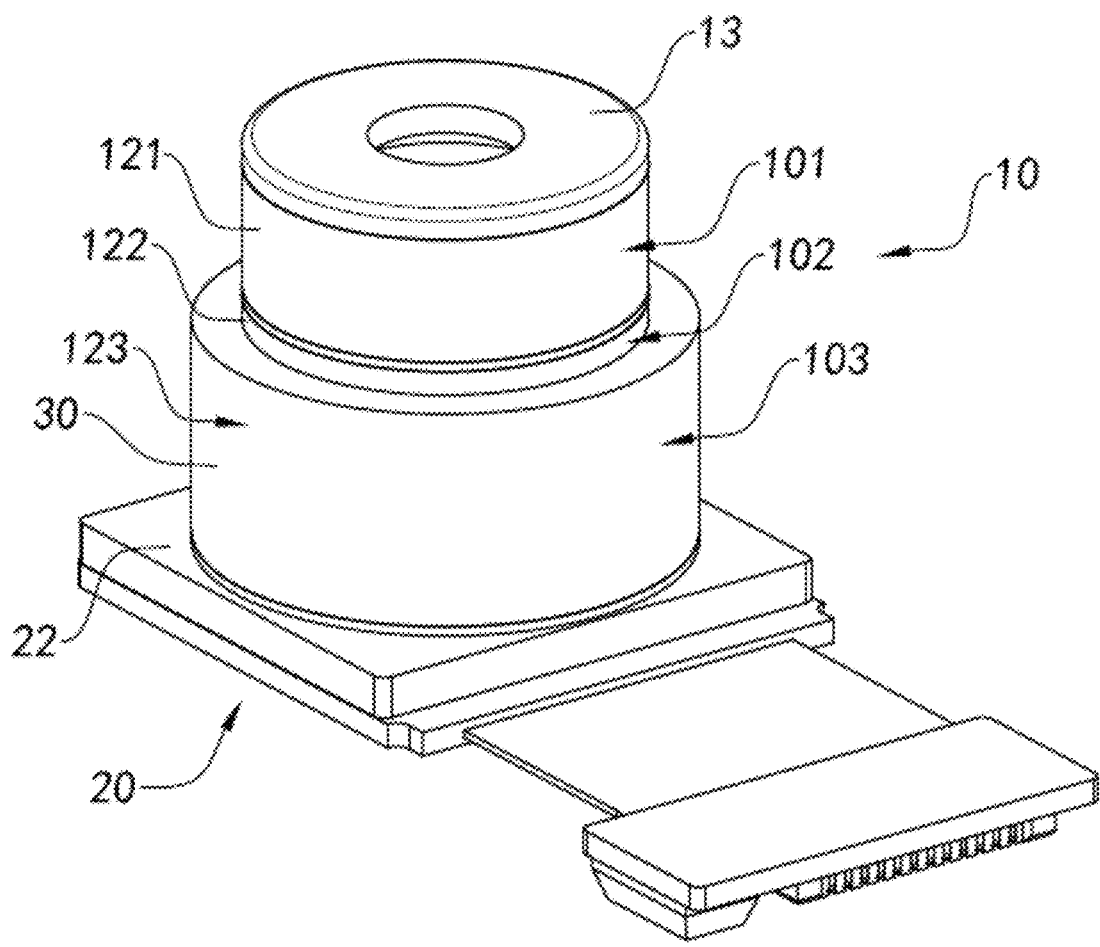
FIG. 1 is a perspective view of a camera lens module with one or more optical lens modules according to a first preferred embodiment of the present invention.
Figure 2:
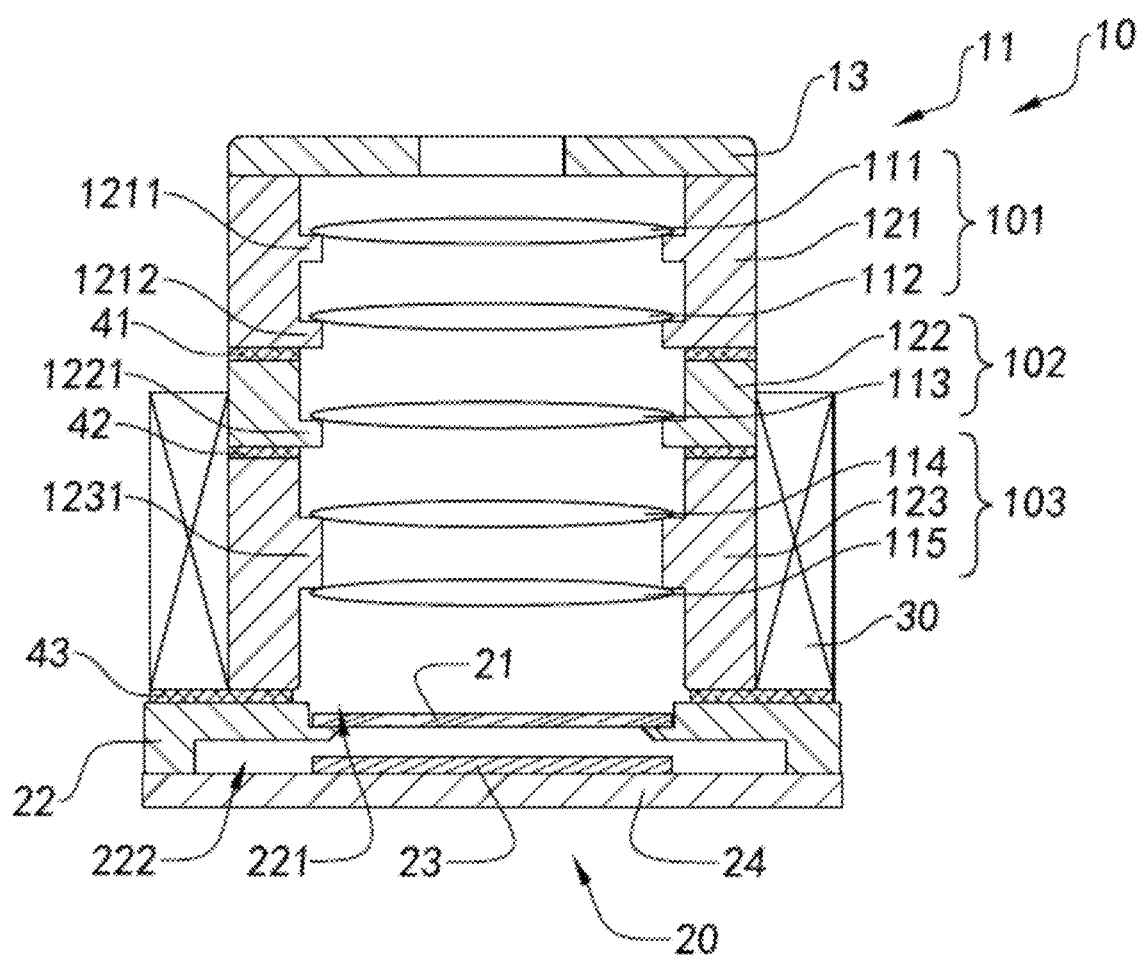
FIG. 2 is a sectional view of the camera lens module with one or more optical lens modules according to the above first preferred embodiment of the present invention.
Figure 3:
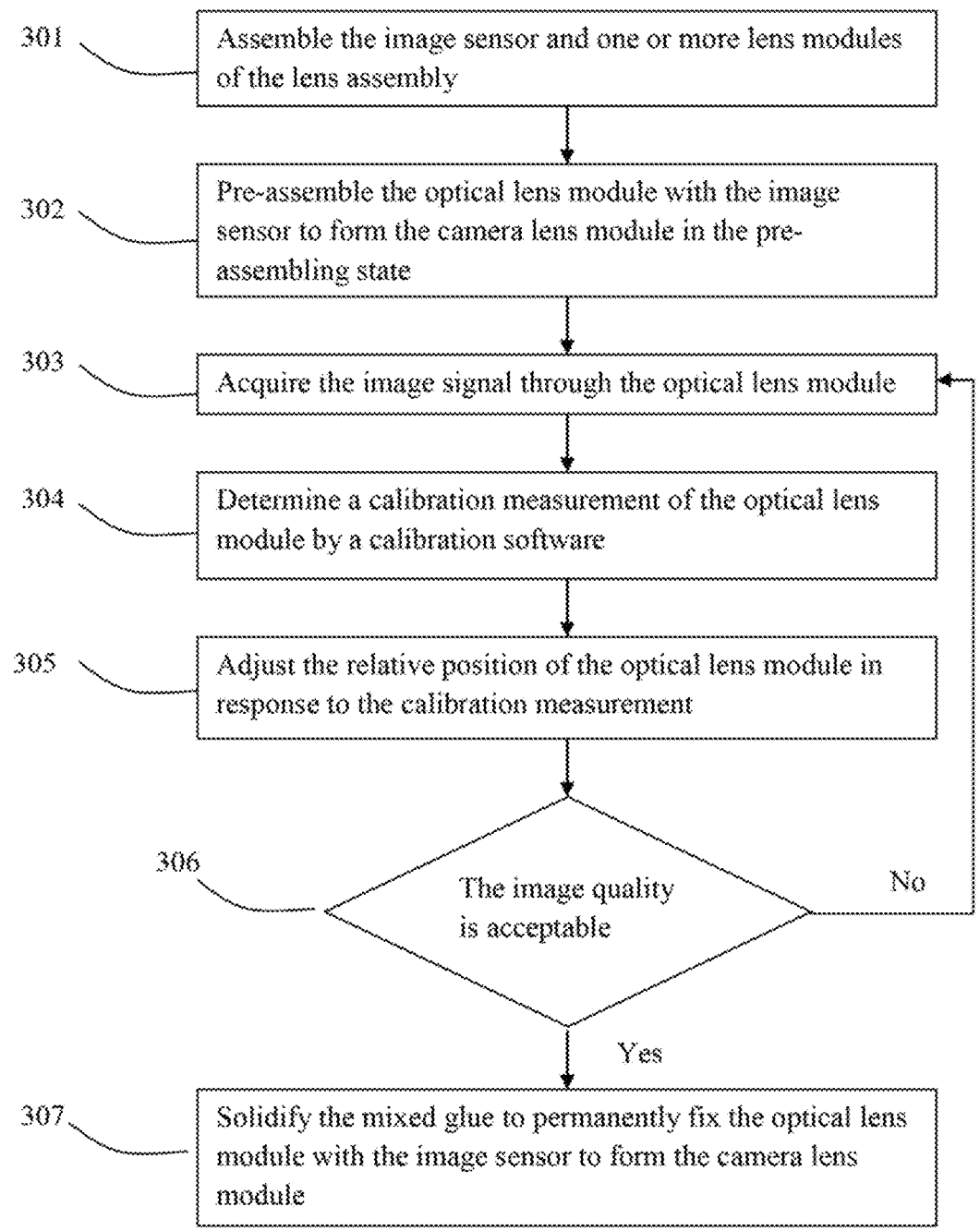
FIG. 3 is a flow diagram illustrating the assembling method of the camera lens module with one or more optical lens modules according to the above first preferred embodiment of the present invention.

Referring to FIGS. 1 to 3 of the drawings, a camera lens module according to a first preferred embodiment of the present invention is illustrated. As shown in FIGS. 1 to 3, the camera lens module, which is configured as a split-lens module, comprises a lens assembly 10 and an image sensor 20, wherein the lens assembly 10 is located along a light path of the image sensor 20, such that the image sensor 20 can pick up light incident through the lens assembly 10 and can convert the light into image signals. Accordingly, the relative assembling position of the lens assembly 10 with respect to the image sensor 20 is adjustable.

According to the preferred embodiment, the image sensor 20 comprises a color filter 21, a lens base 22, a photosensitive chip 23, and a control circuit board 24. The color filter 21 is coupled at the lens base 22 at a position above the photosensitive chip 23. In other words, the color filter 21 is provided along a photosensitive path of the photosensitive chip 23. The photosensitive chip 23 is operatively coupled on top of the control circuit board 24, preferably by glue, wherein the control circuit board 24 is supported at a bottom of the lens base 22.

In particular, the lens base 22, which is configured to have a hollow structure, has a first holding groove 221 indently formed within an inner surrounding wall of the lens base 22 at an upper portion thereof, and a second holding groove 222 indently formed within the inner surrounding wall of the lens base 22 at a lower portion thereof to coaxially align with the first holding groove 221. The color filter 21 and the photosensitive chip 23 are supported by the first holding groove 221 and the second holding groove 222 respectively, wherein the photosensitive chip 23 is operatively coupled onto the control circuit board 24, such that the photosensitive chip 23 picks up light incident from the lens assembly 10 through the lens base 22 and converts the light into image signals.

In one embodiment, the first and second holding grooves 221, 222 have a rectangular cross section. It is appreciated that the first and second holding grooves 221, 222 can be modified to have different cross section according to the structural configuration of the image sensor 20.

The lens assembly 10 comprises an optical lens set 11, a lens barrel set 12, and an aperture member 13 coupled on top of the lens barrel set 12, wherein the optical lens set 11 is located within the lens barrel set 12 at a position below the aperture member 13 and is located along the photosensitive path of the photosensitive chip 23. The lens barrel set 12 is coupled at the image sensor 20, wherein a relative assembling position of the lens barrel set 12 is arranged to be adjustable with respect to the image sensor 20 to ensure the image quality of the camera lens module.

The camera lens module further comprises a driver unit 30 operatively provided at the lens barrel set 12 and coupled to the lens base 22, wherein the driver unit 30 is arranged to selectively adjust the positional displacement of the lens barrel set 12 along the photosensitive path of the photosensitive chip 23. In one embodiment, the driver unit 30 comprises a voice coil motor to drive the lens barrel set 12 to move.

According to the preferred embodiment, the optical lens set 11 comprises a first optical lens 111, a second optical lens 112, a third optical lens 113, a fourth optical lens 114, and a fifth optical lens 115, wherein the first to fifth optical lenses 111-115 are arranged for convergence or divergence of the light beam to be collected. The lens barrel set 12 comprises a first lens barrel 121, a second lens barrel 122, and a third lens barrel 123.

Accordingly, the aperture member 13 is coupled at a top edge of the first lens barrel 121 at a position above the first optical lens 111, wherein the first lens barrel 121 comprises a first positioning unit 1211 and a second positioning unit 1212. The first and second positioning units 1211, 1212 are radially and inwardly extended from an inner barrel wall of the first lens barrel 121. Preferably, the first and second positioning units 1211, 1212 are provided at a mid-portion and a lower portion of the first lens barrel 121 respectively, wherein the first and second optical lenses 111, 112 are supported by the first and second positioning units 1211, 1212 respectively, such that the first and second optical lenses 111, 112 are spaced apart from each other and are securely mounted within the first lens barrel 121. It is worth mentioning that the first optical lens 111 and the second optical lens 112 are supported within the first lens barrel 121 to form a first optical lens module 101. According to the preferred embodiment, the first optical lens module 101 is mounted at the outermost position of the camera lens module, i.e. the top position of the lens assembly 10 and the farthest distance from the image sensor 20, wherein the aperture member 13 is coupled at a top portion of the first optical lens module 101.

The second lens barrel 122 comprises a third positioning unit 1221 radially and inwardly extended from an inner barrel wall of the second lens barrel 122. Preferably, the third positioning unit 1221 is provided at a lower portion of the second lens barrel 122, wherein the third optical lens 113 is supported by the third positioning unit 1221, such that the third optical lens 111 is securely mounted within the first lens barrel 121 to form a second optical lens module 102.

The third lens barrel 123 comprises a fourth positioning unit 1231 radially and inwardly extended from an inner barrel wall of the third lens barrel 123. Preferably, the fourth positioning unit 1231 is provided at a mid-portion of the third lens barrel 123, wherein the fourth and fifth optical lenses 114, 115 are supported by the fourth positioning unit 1231. In particular, the fourth optical lens 114 is supported on top of the fourth positioning unit 1231 and the fifth optical lens 115 is supported on below the fourth positioning unit 1231. It is worth mentioning that the driver unit 30 is operatively integrated with the third lens barrel 123, such that the fourth and fifth optical lenses 114, 115, the third lens barrel 123, and the driver unit 30 are assembled together to form a third optical lens module 103.

According to the preferred embodiment, the first positioning unit 1211, the second positioning unit 1212 and the third positioning unit 1221, are integrally protruded from the inner barrel walls of the first and second lens barrels 121, 122 to form a plurality of annular protruding platforms. It is appreciated that any shape of the protruding platform can be modified as long as the corresponding optical lens can be supported thereby.

Accordingly, the first optical lens module 101 is coaxially coupled at the second optical lens module 102 by a first adhering element 41. The second optical lens module 102 is coaxially coupled at the third optical lens module 103 by a second adhering element 42. The third optical lens module 103 is coupled at the lens base 22 by a third adhering element 43. Each of the first through third adhering elements 41, 42, 43 is preferably a mixture glue comprising UV glue mixed with thermosetting adhesive, wherein the mixture glue is in a semi-solidified state under UV exposure and is solidified after heat treatment, such as within an oven or in a heated environment. Therefore, the first optical lens module 101, the second optical lens module 102, the third optical lens module 103, and the lens base 22 are coupled with each other by means of the mixture glue in the semi-solidified state to complete the pre-assembling of the camera lens module. After the initial pre-assembling process, the first optical lens module 101, the second optical lens module 102 and the third optical lens module 103 are optical elements to be calibrated. Under the initial assembling condition, the first optical lens module 101, the second optical lens module 102, and the third optical lens module 103 can be selectively adjusted to correct an optical specification of the camera lens module for calibration. In other words, the relative assembling positions of the first optical lens module 101, the second optical lens module 102, the third optical lens module 103 and the lens base 22 are adjustable to fix the assembling tolerance of the lens assembly 10, so as to achieve the acquired image quality of the camera lens module. Once the relative positions are fixed and corrected, the mix glues are then solidified to securely retain and permanently mount the relative positions of the first optical lens module 101, the second optical lens module 102, the third optical lens module 103 and the lens base 22 for the camera lens module.

Preferably, at least one of the optical lenses in one of the first optical lens module 101, the second optical lens module 102, and the third optical lens module 103 is a movable optical lens as a optical correction lens to correct and fix the optical specification of the camera lens module. The rest of the optical lenses can be the fixed optical lenses. In other words, at least one of the optical lenses in one of the first optical lens module 101, the second optical lens module 102, and the third optical lens module 103 serves as an optical element to be calibrated while the rest of the optical lens modules are fixed optical lenses.

It is worth mentioning that only one lens barrel can be constructed in the lens barrel set 12. Preferably, more than one lens barrels are constructed to form the lens barrel set 12, and more than one optical lenses are mounted on each of the lens barrels. The lens barrel with the optical lens or the aperture member can form one or more optical lens modules. In other words, the numbers of optical lens, lens barrel, and optical lens module can be varied depending on the structural configuration of the camera lens module. Therefore, the present invention should not be limited by the numbers of optical lens, lens barrel, and optical lens module.

According to the preferred embodiment, the present invention further provides a method of assembling the camera lens module with one or more optical lens modules, which comprises the following steps.

Step 301: Assemble the image sensor and one or more optical lens modules of the camera lens module.

Step 302: Pre-assemble the optical lens module with the image sensor to form the camera lens module in the pre-assembling state.

Step 303: Acquire one or more image signals through the optical lens module of the camera lens module.

Step 304: Determine a calibration measurement including calibration parameter of the optical lens module by a calibration software.

Step 305: Adjust the assembling position of the optical lens module in response to the calibration measurement.

Step 306: When the assembling position of the optical lens module is adjusted to achieve a desired resolution of the camera lens module, go to Step 307. Otherwise, repeat Step 303 to Step 305 until the desired resolution of the each of the optical lens modules of the lens assembly, i.e. the image quality is acceptable, is obtained.

Step 307: Solidify the mixture glue to permanently fix the one or more optical lens modules of the lens assembly with the image sensor to form the camera lens module.

Accordingly, the Step 301 further comprises the following steps. The color filter 21 is coupled at the first holding groove 221 of the lens base 22. The photosensitive chip 23 is operatively coupled on the top side of the control circuit board 24. Then, the lens base 22 is coupled on the top side of the control circuit board 24 to support the photosensitive chip 23 within the second holding groove 222. The assembling process of the image sensor 20 is completed to couple with the lens assembly 10.

The optical lens set 11, the lens barrel set 12, and the aperture member 13 are assembled to form the first optical lens module 101, the second optical lens module 102, and the third optical lens module 103.

In particular, the aperture member 13 is coupled on the top portion of the first lens barrel 121. The first and second optical lenses 111, 112 are supported by the first and second positioning units 1211, 1212 of the first lens barrel 121 respectively to form the first optical lens module 101. Preferably, in the first optical lens module 101, the aperture member 13, the first optical lens 111, and the second optical lens 112 are affixedly mounted to the first lens barrel 121 in an immovable manner, such that the relative assembling positions of the aperture member 13, the first optical lens 111, and the second optical lens 112 cannot be adjusted to the first lens barrel 121 for the first optical lens module 101.

The third optical lens 113 is supported by the third positioning unit 1221 of the second lens barrel 122. Preferably, the relative position of the third optical lens 113 cannot be adjusted within the second lens barrel 122, such that the third optical lens 113 is affixed within the second lens barrel 122 by the third positioning unit 1221 thereof in an immovable manner.

The fourth optical lens 114 is mounted at a top side of the fourth positioning unit 1231 of the third lens barrel 123 while the fifth optical lens 115 is mounted at a bottom side of the fourth positioning unit 1231 of the third lens barrel 123. Preferably, the relative positions of the fourth optical lens 114 and the fifth optical lens 115 cannot be adjusted within the third lens barrel 123, such that the fourth optical lens 114 and the fifth optical lens 115 are affixed within the third lens barrel 123 by the fourth positioning unit 1231 thereof in an immovable manner. Accordingly, the driver unit 30 is coaxially mounted to the third lens barrel 123.

In the Step 302, the third adhering element 43 is initially applied to couple the third optical lens module 103 at the lens base 22, the second adhering element 42 is applied to coaxially couple the second optical lens module 102 at the third optical lens module 103, and then the first adhering element 41 is applied to coaxially couple the first optical lens module 101 at the second optical lens module 102. Therefore, the pre-assembly of the optical lens module with the image sensor is completed. It is worth mentioning that the adhering steps can be reversed that the first adhering element 41 is applied to initially couple the first optical lens module 101 at the second optical lens module 102, the second adhering element 42 is applied to coaxially couple the second optical lens module 102 at the third optical lens module 103, and then the third adhering element 43 is applied to couple the third optical lens module 103 at the lens base 22, in order to complete the pre-assembly of the optical lens module with the image sensor.

It is worth mentioning that the first, second, third adhering elements 41, 42, 43 are applied in a semi-solidified state during the pre-assembling process. As it is mentioned above each of the first through third adhering elements 41, 42, 43 is a mixture glue comprising UV glue mixed with thermo-setting adhesive, wherein the mixture glue is in a semi-solidified state under UV exposure and is solidified after heat treatment. Therefore, the mixture glue in a semi-solidified state for pre-assembling the camera lens module, such that the optical lens modules can be slightly moved and adjusted for calibration while the optical lens modules can be held correspondingly. In other words, through the pre-assembling process, the relative assembling positions of the first optical lens module 101, the second optical lens module 102, and the third optical lens module 103 can be selectively adjusted to align with a centerline of the lens assembly 10 so as to align with the centerline of the photosensitive chip 23 within the deviation range thereof for achieving the acquired image quality of the camera lens module.

In the Step 303 and the Step 304, the camera lens module at the pre-assembling state is electrified to collect the one or more image signals from the image sensor. Through the calibration software, the calibration measurements including calibration parameters of the first optical lens module 101, the second optical lens module 102, and the third optical lens module 103 will be determined.

Preferably, the image collection of the camera lens module is based on MTF (Modulation Transfer Function) test target, the image quality is determined by a MTF value. Accordingly, the higher MTF value refers to higher image quality. A plurality of MTF values will be determined for every image collected from the camera lens module and will be compared with a predetermined threshold. When the MTF value is greater than or equal to the predetermined threshold, the collection and calibration is completed. When the MTF value is lesser than the predetermined threshold, the image collection is repeated for further calibration.

It is worth mentioning that in each image acquisition process, the camera lens module must be strictly controlled for capturing each image under predetermined environment parameters which includes the capturing distance and light source parameters of the test target and the camera lens module to ensure the accuracy and consistency of the image acquisition for easily calibration.

In addition to the MTF values, the camera lens module should be monitored for eliminating black spot, distortion, and/or shades during the image acquisition process.

It is worth mentioning that the calibration software is used for calibrating the relative assembling positions of the first optical lens module 101, the second optical lens module 102, and the third optical lens module 103 based on the optical sensitivity of the optical lens. Accordingly, the calibration process of the assembling positions of the first optical lens module 101, the second optical lens module 102, and the third optical lens module 103, based on the calibration software used, comprises the following steps. (1) Measure the optical characteristics of the camera lens module prior to the calibration, including MTF values, light eccentricity measurement, light axis inclination angle, and curvature of field. (2) In response to the MTF values, light eccentricity measurement, light axis inclination angle, and curvature of field corresponding to the relative assembling positions of the first optical lens module 101, the second optical lens module 102, and the third optical lens module 103, determine the calibration measurements such as calibration parameters of the first optical lens module 101, the second optical lens module 102, and the third optical lens module 103.

After the calibration measurement of the optical lens module is determined in the Step 304, the relative positions of the first optical lens module 101, the second optical lens module 102, and the third optical lens module 103 will be adjusted in response to the calibration measurement as shown in the Step 305. It is worth mentioning that the relative positions of the optical lens modules can be adjusted at the same time or individually. The relative positions of the first optical lens module 101, the second optical lens module 102, and the third optical lens module 103 can be selectively adjusted to align with the centerline of the lens assembly 10 so as to align with the centerline of the photosensitive chip 23 within the deviation range thereof for achieving the acquired image quality of the camera lens module.

In addition, the relative positions of the first optical lens module 101, the second optical lens module 102, and the third optical lens module 103 are calibrated by the following steps. The relative assembling positions of the first optical lens module 101, the second optical lens module 102, and the third optical lens module 103 are defined at six axes X, Y, Z, U, V, W of the camera lens module. Adjust the relative position of each of the first optical lens module 101, the second optical lens module 102, and the third optical lens module 103 along at least one of the horizontal direction, vertical direction, inclination direction, and circumferential direction.

It is worth mentioning that the image acquisition is required for every position adjustment of the first optical lens module 101, the second optical lens module 102, and the third optical lens module 103, such that each calibration of the camera lens module is based on the previous image acquisition. In other words, the Step 303, the Step 304, and the Step 305 are repeated to calibrate the relative positions of the first optical lens module 101, the second optical lens module 102, and the third optical lens module 103 until the acquired image quality of the camera lens module is achieved and then the Step 307 is executed to solidify the mixture glue to form the lens assembly 10.

Accordingly, the mixture glue is exposed under UV environment in the Step 302. Then, after the calibration process is completed, the camera lens module is, for example, sent into the oven for heat treatment of the mixture glue. Once the mixture glue is solidified, the components of the camera lens module are permanently fixed to form the integrated configuration so as to prevent any unwanted displacement of each of the components which will affect the image quality of the camera lens module.

It is worth mentioning that, in the Step 302, the first optical lens module 101, the second optical lens module 102, and the third optical lens module 103 are overlapped with each other in a predetermined array. In other words, the relative positions of the first optical lens module 101, the second optical lens module 102, and the third optical lens module 103 cannot be interchanged. However, the assembling order of the first optical lens module 101, the second optical lens module 102, and the third optical lens module 103 can be altered. For example, the first optical lens module 101 can be initially pre-coupled to the second optical lens module 102, and the second optical lens module 102 can be pre-coupled to the third optical lens module 103, then the third optical lens module 103 is pre-coupled to the lens base 22 to form the camera lens module. Alternatively, the second optical lens module 102 can be initially pre-coupled to the third optical lens module 103, and the first optical lens module 101 can be pre-coupled to the second optical lens module 102, then the third optical lens module 103 is pre-coupled to the lens base 22 to form the camera lens module. Or, after coupling the first optical lens module 101 to the second optical lens module 102, the first and second optical lens modules 101, 102 are coupled to the third optical lens module 103, and then the third optical lens module 103 is coupled to the lens base 22 to form the camera lens module. Or after coupling the first, second, and third optical lens modules 101, 102, 103 with each other, the three lens modules are coupled to the lens base 22 to form the camera lens module. The present invention should not be limited by the assembling order and numbers of the optical lens modules.

When four or more optical lens modules are assembled, the relative positions of the optical lens modules, beside the first and the last optical lens modules, can be interchangeable.

It is worth mentioning that during the assembling process and the pre-assembling process, different tolerances of the camera lens module must be controlled, including (1) the assembling tolerance of the connection between the aperture member 13 and the first lens barrel 121, (2) the assembling tolerances of the connection between the first optical lens 111 and the first lens barrel 121, and the connection between the second optical lens 111 and the first lens barrel 121, (3) the assembling tolerance of the connection between the third optical lens 113 and the second lens barrel 122, (4) the assembling tolerances of the connection between the fourth optical lens 114 and the third lens barrel 123, and the connection between the fifth optical lens 115 and the third lens barrel 123, (5) the assembling tolerances of the connection between the color filter 21 and the lens base 22, the connection between the lens base 22 and the control circuit board 24, and the connection between the photosensitive chip 23 and the control circuit board 24. If any one of the above tolerances is unacceptable, there will be hard to calibrate the relative positions of the first optical lens module 101, the second optical lens module 102, and the third optical lens module 103, or even cannot achieve the desired resolution of the camera lens module.

It is worth mentioning that the calibration of the relative positions of the optical lens modules also refers to the calibration of the relative assembling positions of the optical lens modules.

Figure 4:
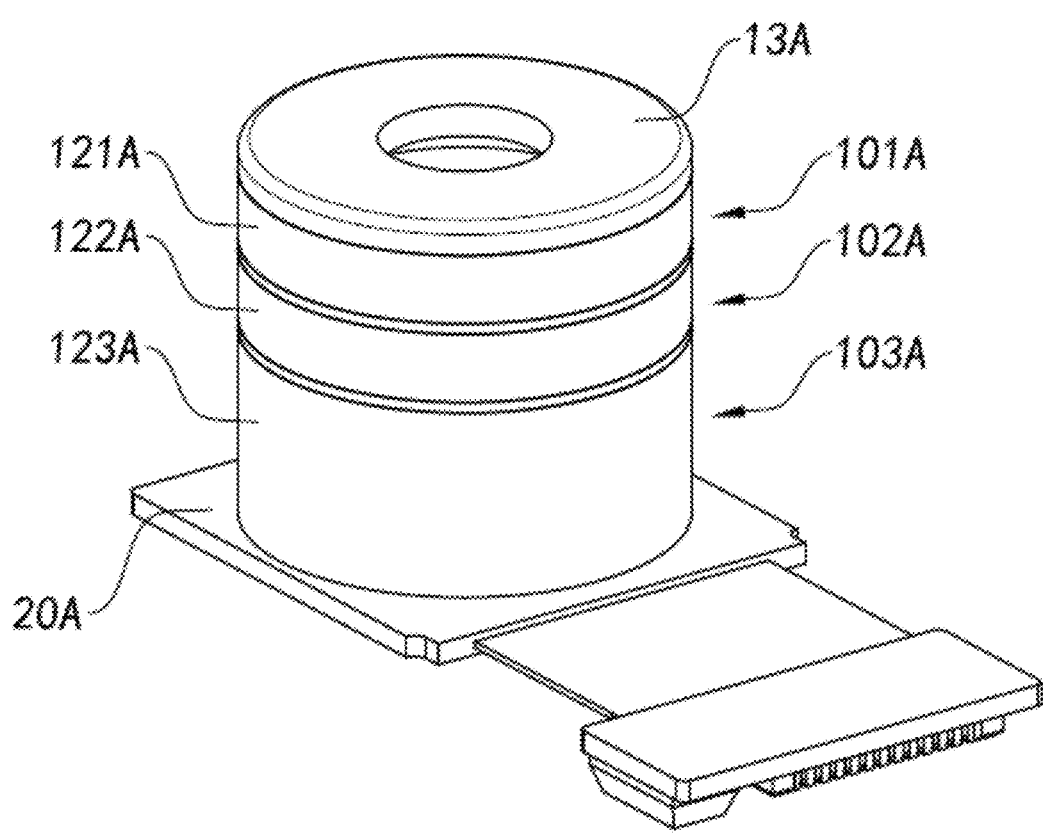
FIG. 4 is a perspective view of a camera lens module with one or more optical lens modules according to a second preferred embodiment of the present invention.
Figure 5:
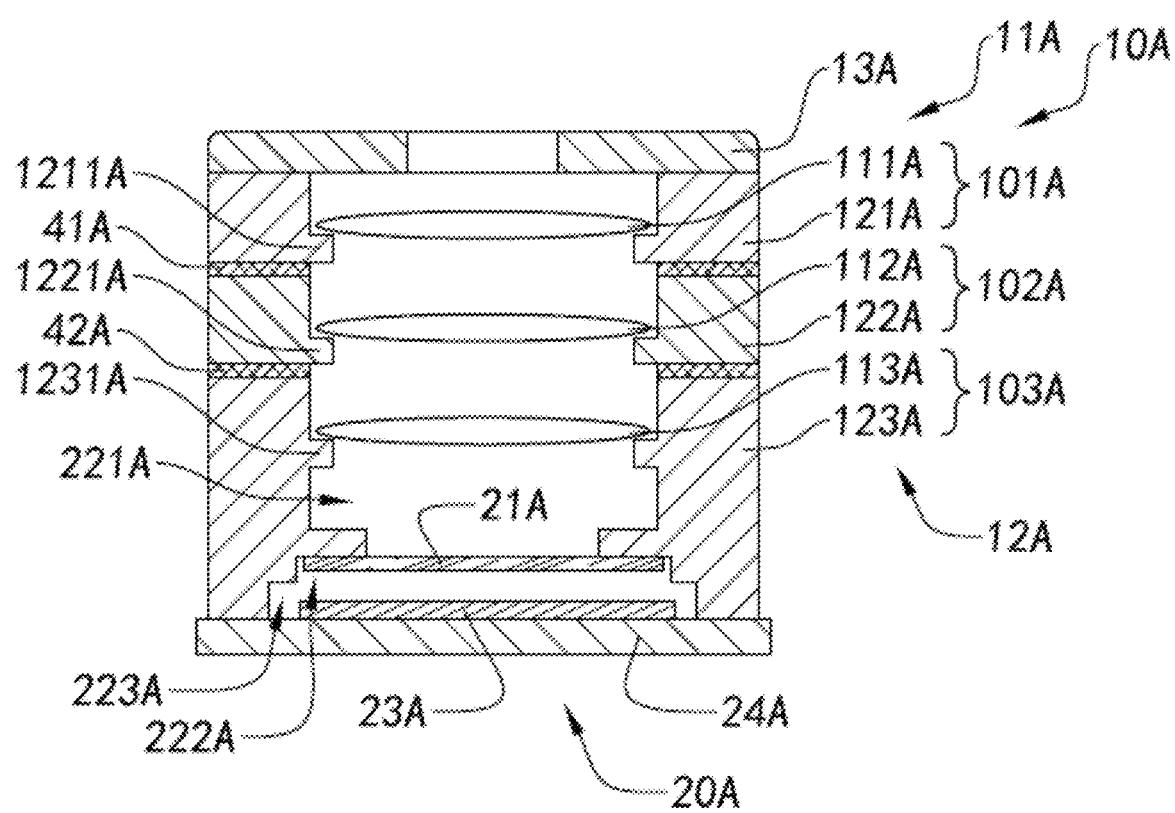
FIG. 5 is a sectional view of the camera lens module with one or more optical lens modules according to the above second preferred embodiment of the present invention.

As shown in FIGS. 4 and 5, a camera lens module according to a second embodiment illustrates an alternative mode of the first embodiment, wherein the camera lens module comprises a lens assembly 10A and an image sensor 20A, wherein the lens assembly 10A is located along a light path of the image sensor 20A, such that the image sensor 20A can pick up light incident through the lens assembly 10A and can convert the light into image signals. Accordingly, the assembling position of the lens assembly 10A with respect to the image sensor 20A is adjustable.

The lens assembly 10A comprises an optical lens set 11A, a lens barrel set 12A, and an aperture member 13A coupled on top of the lens barrel set 12A, wherein the optical lens set 11A is located within the lens barrel set 12A at a position below the aperture member 13A and is located along the photosensitive path of the photosensitive chip 23A. The lens barrel set 12A is coupled at the image sensor 20A, wherein the assembling position of the lens barrel set 12A with respect to the image sensor 20A is adjustable to ensure the image quality of the camera lens module.

According to the second embodiment, the optical lens set 11A comprises a first optical lens 111A, a second optical lens 112A, and a third optical lens 113A. The lens barrel set 12A comprises a first lens barrel 121A, a second lens barrel 122A, and a third lens barrel 123A. The first lens barrel 121A, the second lens barrel 122A, and the third lens barrel 123A are orderly and coaxially coupled with each other that the second lens barrel 122A is located between the first lens barrel 121A and the third lens barrel 123A. The first optical lens 111A, the second optical lens 112A, and the third optical lens 113A are supported within the first lens barrel 121A, the second lens barrel 122A, and the third lens barrel 123A respectively. The third lens barrel 123A also serves as a lens base. It is worth mentioning that the driver unit is omitted in the camera lens module of the second embodiment as a fixed-focus camera lens module. According to the present invention, the camera lens module in different embodiments can be the fixed-focus camera lens module or the zoom camera lens module.

According to the second embodiment, the image sensor 20A comprises a color filter 21A, a lens base 22A (i.e. the third lens barrel 123A), a photosensitive chip 23A, and a control circuit board 24A. The color filter 21A is coupled at the third lens barrel 123A at a position above the photosensitive chip 23A. In other words, the color filter 21A is provided along a photosensitive path of the photosensitive chip 23A. The photosensitive chip 23A is operatively coupled on top of the control circuit board 24A.

In particular, the third lens barrel 123A, which is configured to have a hollow structure, has a first holding groove 221A indently formed within an inner surrounding wall of the third lens barrel 123A, a second holding groove 222A indently formed within the inner surrounding wall of the third lens barrel 123A, and a third holding groove 223A indently formed within the inner surrounding wall of the third lens barrel 123A, wherein the first, second, and third holding grooves 221A, 222A, 223A are coaxially aligned with each other and are formed at an upper portion, a mid-portion, and a lower portion of the third lens barrel 123A respectively. The color filter 21A is supported by the second holding groove 222A, the photosensitive chip 23A is supported by the third holding groove 223A and is operatively coupled on the top side of the control circuit board 24A, wherein the photosensitive chip 23A picks up light incident from the lens assembly 10A and converts the light into image signals.

The aperture member 13A is coupled at a top portion of the first lens barrel 121A, wherein the first lens barrel 121A comprises a first positioning unit 1211A formed at the lower portion of the first lens barrel 121A. The first positioning unit 1211A is radially and inwardly extended from an inner barrel wall of the first lens barrel 121A, wherein the first positioning unit 1211A is integrally protruded from the inner barrel walls of the first lens barrel 121A to form an annular protruding platform. The first optical lens 111A is supported at the first positioning unit 1211A of the first lens barrel 121A to form a first optical lens module 101A. Accordingly, the first optical lens 11A is located at the farther location of the camera lens module where the aperture member 13A is coupled at the top portion of the first optical lens module 101A.

The second lens barrel 122A has a second positioning unit 1221A formed at the lower portion of the second lens barrel 122A. The second positioning unit 1221A is radially and inwardly extended from an inner barrel wall of the second lens barrel 122A, wherein the second positioning unit 1221A is integrally protruded from the inner barrel walls of the second lens barrel 122A to form an annular protruding platform. The second optical lens 112A is supported at the second positioning unit 1221A of the second lens barrel 122A to form a second optical lens module 102A.

The third lens barrel 123A has a third positioning unit 1231A formed at the upper portion of the third lens barrel 123A. The third positioning unit 1231A is radially and inwardly extended from an inner barrel wall of the third lens barrel 123A, wherein the third positioning unit 1231A is integrally protruded from the inner barrel walls of the third lens barrel 123A to form an annular protruding platform. The third positioning unit 1231A is located above the first holding groove 221A. The third optical lens 113A is supported at the third positioning unit 1231A of the third lens barrel 123A to form a third optical lens module 103A. Since the third optical lens 113A is supported within the third lens barrel 123A, the color filter 21A, the photosensitive chip 23A, and the control circuit board 24A are assembled together with the third optical lens 113A in the third lens barrel 123A. In other words, the color filter 21A, the photosensitive chip 23A, the control circuit board 24A are assembled in the third lens barrel 123A to form the image senor 20A.

It is worth mentioning that the first holding groove 221A is configured to have a circular cross section while the second and third holding grooves 222A, 223A are configured to have a rectangular cross section. The first positioning unit 1211A, the second positioning unit 1221A, and the third positioning unit 1231A are configured to have a circular protruding platform. The shapes of the holding groove and the positioning unit are shown for illustrative purpose and should not be limited. It is worth mentioning that the first holding groove 221A, the second holding groove 222A, and the third holding groove 223A can be modified to have different structures for supporting the color filter 21A, the photosensitive chip 23A, and the control circuit board 24A. Also, the first positioning unit 1211A, the second positioning unit 1221A, and the third positioning unit 1231A can be modified to have different structures for supporting the first optical lens 111A, the second optical lens 112A, and the third optical lens 113A.

Before the pre-assembling process of the camera lens module, the optical lens modules are assembled. In particular, the aperture member 13A and the first optical lens 111A are coupled at the first lens barrel 121A to form the first optical lens module 101A. The second optical lens 112A is coupled at the second lens barrel 122A to form the second optical lens module 102A. The third optical lens 113A is coupled at the third lens barrel 123A to form the third optical lens module 103A. Then, the color filter 21A, the photosensitive chip 23A, and the control circuit board 24A are coupled at the third lens barrel 123A to form the image sensor 20A. During the assembling process of each component, different tolerances of the camera lens module must be controlled with the acceptable range. If any one of the above assembling tolerances is unacceptable, there will be hard to calibrate the relative positions of the first optical lens module 101A, the second optical lens module 102A, and the third optical lens module 103A, or even cannot achieve the desired resolution of the camera lens module.

According to the second embodiment, the first optical lens module 101A and the second optical lens module 102A are pre-assembled, wherein the optical lens module 101A and the second optical lens module 102A are calibrated to selectively adjust the relative positions of the optical lens module 101A and the second optical lens module 102A. In other words, each of the first optical lens module 101A and the second optical lens module 102A serves as an optical element to be calibrated to selectively adjust the relative positions of the optical lens module 101A and the second optical lens module 102A.

During the pre-assembling process, the second optical lens module 102A is coupled at the third optical lens module 103A via the first adhering element 41A, and then the first optical lens module 101A is coupled at the second optical lens module 102A via the second adhering element 42A. It is worth mentioning that the above steps are reversible, wherein the first optical lens module 101A is coupled at the second optical lens module 102A via the second adhering element 42A and then the second optical lens module 102A is coupled at the third optical lens module 103A via the first adhering element 41A. It is worth mentioning that the first adhering element 41A and the second adhering element 42A are in a semi-solidified state under the UV exposure during the pre-assembling process.

The calibration of the camera lens module according to the second embodiment is the same as the first embodiment, wherein the relative positions of the first optical lens module 101A and the second optical lens module 102A can be selectively adjusted to align with a centerline of the lens assembly 10A so as to align with the centerline of the photosensitive chip 23A within the deviation range thereof for achieving the acquired image quality of the camera lens module.

Figure 6:
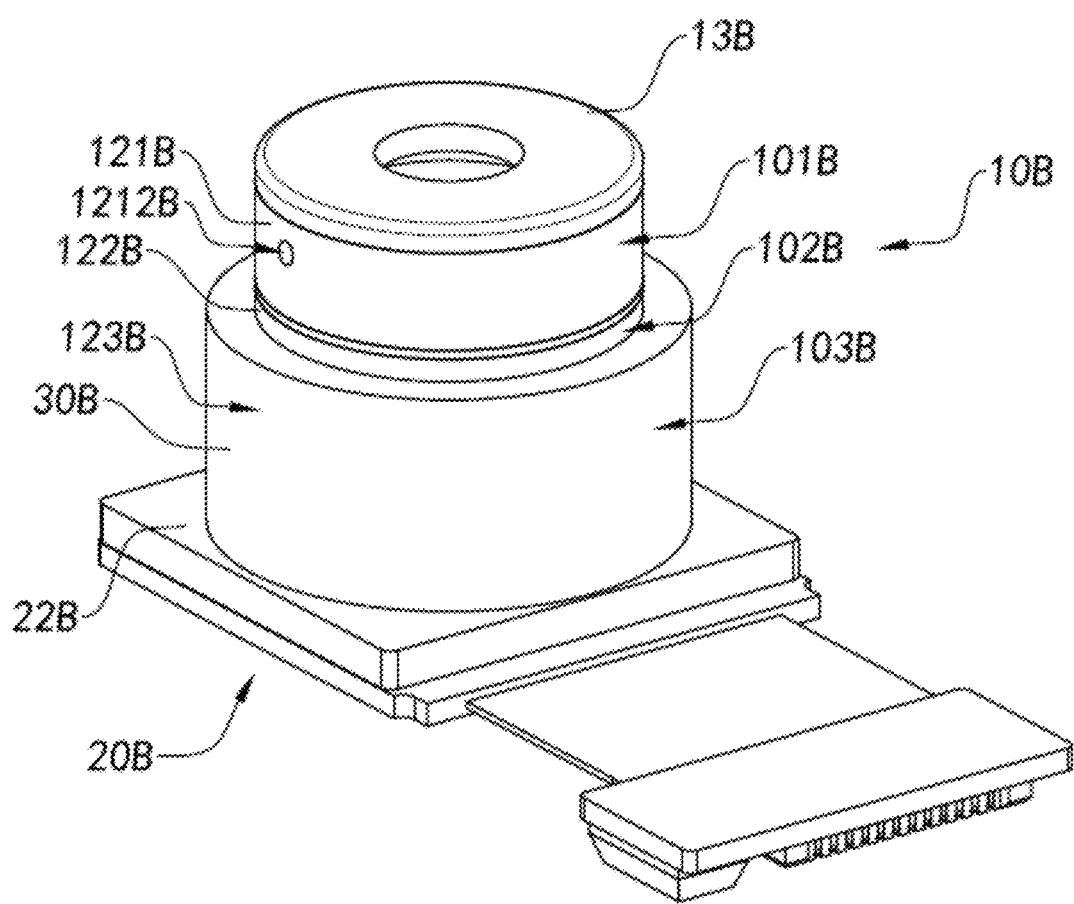
FIG. 6 is a perspective view of a camera lens module with one or more optical lens modules according to a third preferred embodiment of the present invention.
Figure 7:
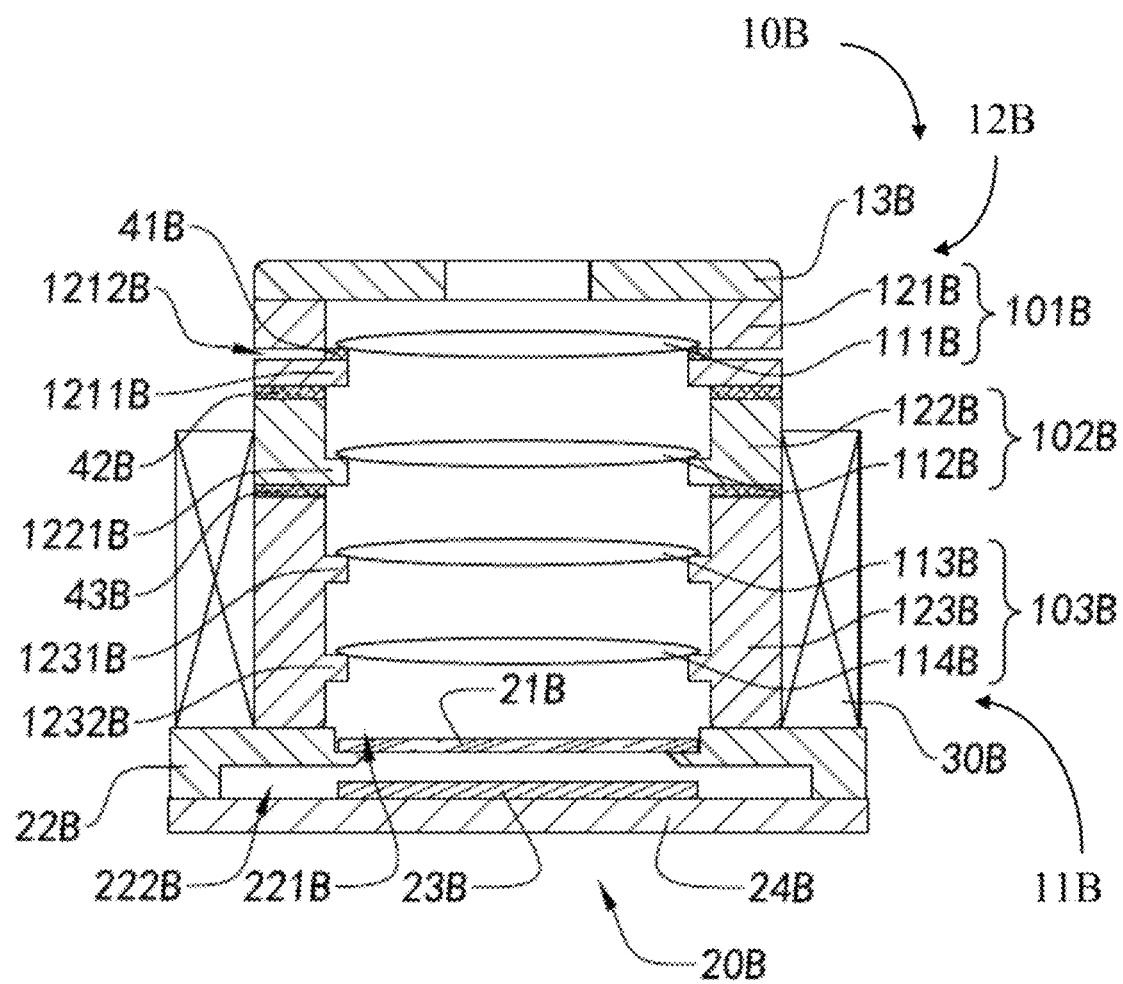
FIG. 7 is a sectional view of the camera lens module with one or more optical lens modules according to the above third preferred embodiment of the present invention.
Figure 8:
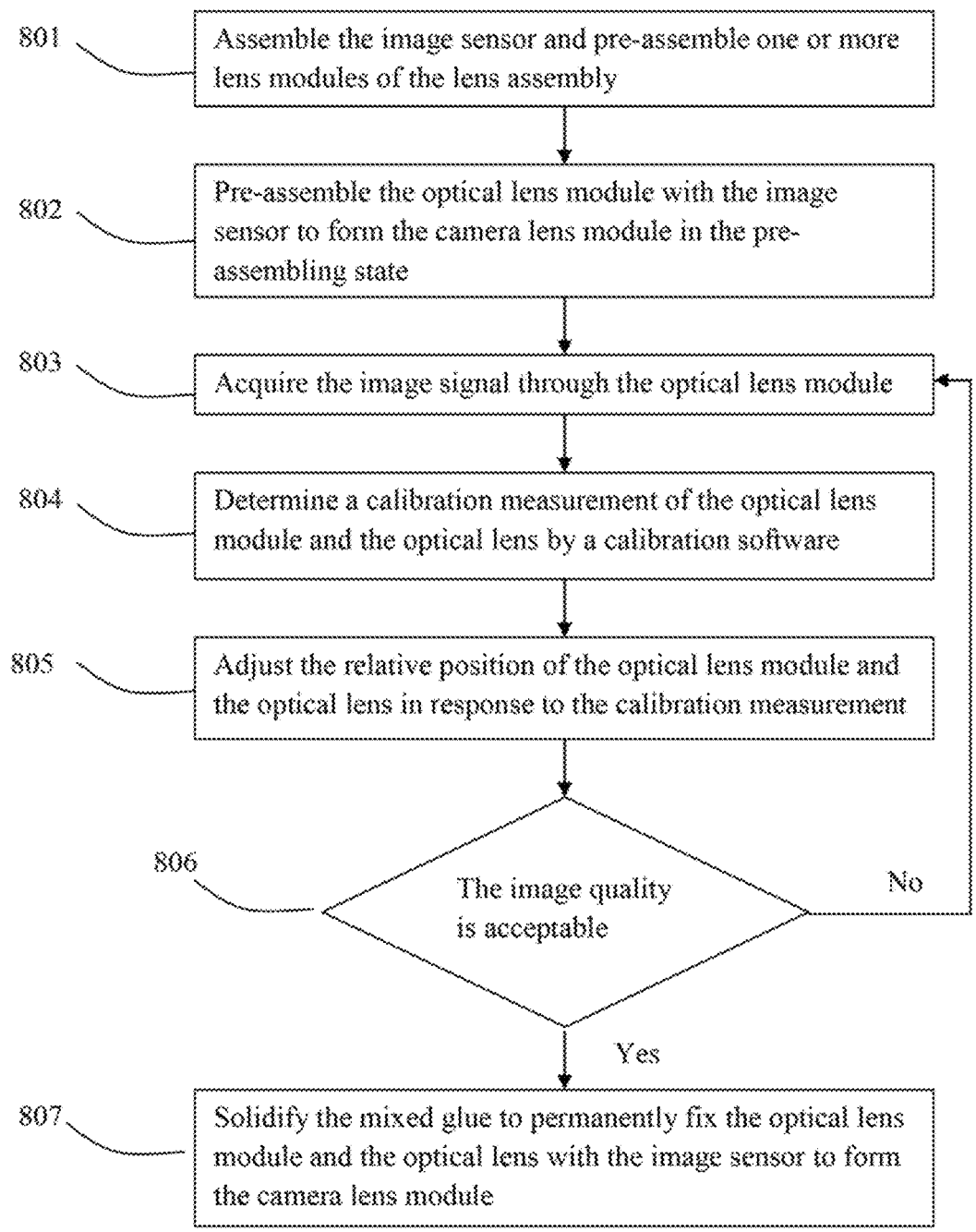
FIG. 8 is a flow diagram illustrating the assembling method of the camera lens module with one or more optical lens modules according to the above third preferred embodiment of the present invention.

As shown in FIGS. 6 to 8, a camera lens module according to a third embodiment illustrates an alternative mode of the first and second embodiments, wherein the camera lens module comprises a lens assembly 10B and an image sensor 20B, wherein the lens assembly 10B is located along a light path of the image sensor 20B, such that the image sensor 20B can pick up light incident through the lens assembly 10B and can convert the light into image signals. Accordingly, the relative assembling position of the lens assembly 10B with respect to the image sensor 20B is adjustable.

The lens assembly 10B comprises an optical lens set 11B, a lens barrel set 12B, and an aperture member 13B, wherein the optical lens set 11B and the aperture member 13B are coupled at the lens barrel set 12B according to the optical path configuration. The optical lens set 11B comprises a first optical lens 111B, a second optical lens 112B, a third optical lens 113B, and a fourth optical lens 114B. The lens barrel set 12B comprises a first lens barrel 121B, a second lens barrel 122B, and a third lens barrel 123B. The aperture member 13B and the first optical lens 111B are spacedly coupled at the first lens barrel 121B according to the optical path configuration. In particular, the aperture member 13B is coupled on a top edge of the first lens barrel 121B while the first optical lens 111B is supported within the first lens barrel 121B to form a first optical lens module 101B. The second optical lens 112B is supported within the second lens barrel 122B to form a second optical lens module 102B. The third optical lens 113B, the fourth optical lens 114B, and the driver unit 30B are coupled at the third lens barrel 123B to form a third optical lens module 103B.

The image sensor 20B comprises a color filter 21B, a lens base 22B, a photosensitive chip 23B, and a control circuit board 24B. The color filter 21B is coupled at the lens base 22B at a position above the photosensitive chip 23B. In other words, the color filter 21B is provided along a photosensitive path of the photosensitive chip 23B. The photosensitive chip 23B is operatively coupled on top of the control circuit board 24B.

The lens base 22B has a first holding groove 221B indently formed within an inner surrounding wall of the lens base 22B and a second holding groove 222B indently formed within the inner surrounding wall of the lens base 22B, wherein the first holding groove 221B and the second holding groove 222B are formed at the upper portion and the lower portion of the lens base 22B respectively. The color filter 21B is supported by the first holding groove 221B. The photosensitive chip 23B is supported by the second holding groove 222B and is operatively coupled on the top side of the control circuit board 24B, wherein the photosensitive chip 23B picks up light incident from the lens assembly 10B and converts the light into image signals.

Accordingly, the third lens barrel 123B is permanently affixed to the lens base 22B, such that the relative position of the third lens barrel 123B cannot be adjusted in response to the lens base 22B. During the assembling process, the third optical lens 113B and the fourth optical lens 114B are supported within the third lens barrel 123B via a third positioning unit 1231B and a fourth positioning unit 1232B respectively. The third and fourth positioning units 1231B, 1232B are radially and inwardly extended from an inner barrel wall of the third lens barrel 123B. In addition, the third optical lens module 103B is permanently affixed to the image sensor 20B, such that the relative position of the third optical lens module 103B cannot be adjusted in response to the image sensor 20B. In other words, the third optical lens module 103B cannot be calibrated during the calibrating process.

During the assembling process of the second optical lens module 102B, the second optical lens 112B is supported within the second lens barrel 122B via a second positioning unit 1221B which is radially and inwardly extended from an inner barrel wall of the second lens barrel 122B. The second optical lens 112B is supported within the second lens barrel 122B to form the second optical lens module 102B for positioning adjustment.

During the assembling process of the first optical lens module 101B, the first optical lens 111B is supported within the first lens barrel 121B via a first positioning unit 1211B which is radially and inwardly extended from an inner barrel wall of the first lens barrel 121B. In particular, the first optical lens 111B is supported at the first positioning unit 1211B via the first adhering element 41B in a semi-solidified state, such that the relative position of the first optical lens 111B is adjustable within the first lens barrel 121B. According to the third embodiment, the first optical lens 111B is arranged for calibration during the calibrating process. In other words, the first optical lens 111B serves as one of the optical element to be calibrated optical elements to be calibrated. In addition, the aperture member 13B is coupled on the top edge of the first lens barrel 121B to form the first optical lens module 101B during the assembling process thereof.

In particular, the first lens barrel 121B has at least one calibration channel 1212B formed at a barrel wall of the first lens barrel 121B to communicate with an interior thereof, wherein the calibration channel 1212B is a through slot. In the third embodiment, there are three calibration channels 1212B evenly formed at the barrel wall of the first lens barrel 121B at a 120° interval with respect to a center thereof. In particular, the calibration channels 1212B are located corresponding to the location of the first optical lens 111B to enable the relative position of the first optical lens 111B to be calibrated through at least one of the calibration channels 1212B. For example, a probe can be slidably inserted into the calibration channel 1212B to contact and move the first optical lens 111B within the first lens barrel 121B, so as to adjust the relative position of the first optical lens 111B within the first lens barrel 121B in a horizontal direction and a vertical direction. Therefore, the calibration of the first optical lens 111B within the first lens barrel 121B can be completed.

During the pre-assembling process of the camera lens module, the third optical lens module 103B is affixed to the image sensor 20B. Then, the second optical lens module 102B is coupled at the third optical lens module 103B via the third adhering element 43B, and the first optical lens module 101B is coupled at the second optical lens module 102B via the second adhering element 42B. Accordingly, the second adhering element 42B and the third adhering element 43B are in a semi-solidified state under UV exposure. Therefore, the relative positions of the second optical lens module 102B and the first optical lens module 101B can be individually adjusted for calibration.

The relative positions of the first optical lens module 101B and the second optical lens module 102B are adjustable. Therefore, the first optical lens module 101B and the second optical lens module 102B are also the optical elements to be calibrated.

The camera lens module is electrified during the pre-assembling process for image acquisition, wherein the calibration measurement including calibration parameter of each of the first optical lens module 101B, the second optical lens module 102B, and the first optical lens 111B is determined through the calibration software. Therefore, the relative positions of the first optical lens module 101B, the second optical lens module 102B, and the first optical lens 111B are individually adjusted with respect to the calibration measurements. It is worth mentioning that the image acquisition is required for every position adjustment of the first optical lens module 101B, the second optical lens module 102B, and the first optical lens 111B, such that each calibration of the camera lens module is based on the previous image acquisition. Once the calibration of the camera lens module is completed, the first adhering element 41B, the second adhering element 42B and the third adhering element 43B are solidified to permanently affix the assembling positions of the first optical lens module 101B, the second optical lens module 102B, and the first optical lens 111B.

It is worth mentioning that when the calibration of the first optical lens module 101B is completed, the calibration channel 1212B must be sealed. For example, a sealing glue can be injected into the calibration channel 1212B to seal the calibration channel 1212B and to secure the relative position of the first optical lens 111B as well. In addition, the sealing glue can be the above mentioned mixture glue, such that when the sealing glue is injected to seal the calibration channel 1212B, the sealing glue is solidified by the heat treatment at the same time when the first adhering element 41B is solidified to secure the relative position of the first optical lens 111B within the first lens barrel 121B. The second adhering element 42B and the third adhering element 43B are also solidified by the heat treatment to secure the relative positions of the first optical lens module 101B and the second optical lens module 102B.

Accordingly, the calibration process can be completed by serving the first optical lens module 101B as the optical element to be calibrated when the second optical lens module 102B and the third optical lens module 103B are combined as one module to be affixed to the lens base 22B. Alternatively, the first optical lens module 101B and the second optical lens module 102B are combined as one module to serve as the optical element to be calibrated, and then the third optical lens module 103B is affixed at the lens base 22B. Therefore, the calibration process can be completed by adjusting the assembling positions of the first optical lens module 101B, the second optical lens module 102B, and the first optical lens 111B.

It is worth mentioning that the first optical lens 111B can be pre-assembled. Alternatively, the second optical lens 112B can also be pre-assembled, and at least one of the third optical lens 113B and the fourth optical lens 114B can be pre-assembled. Each pre-assembled optical lens can be calibrated through the calibration process.

According to the third embodiment, the present invention further comprises a method of assembling the camera lens module with one or more optical lens modules, which comprises the following steps.

Step 801: Assemble the image sensor and pre-assemble one or more lens modules of the lens assembly.

Step 802: Pre-assemble at least one optical lens module with the image sensor to form the camera lens module in the pre-assembling state.

Step 803: Acquire the image signal through the optical lens module of the lens assembly.

Step 804: Determine a calibration measurement including calibration parameter of the optical lens module and the optical lens of the lens assembly by means of a calibration software.

Step 805: Adjust the relative assembling positions of the optical lens module and the optical lens of the lens assembly in response to the calibration measurement.

Step 806: When the assembling positions of each of the optical lens modules and the optical lens are adjusted to obtain a desired resolution of the camera lens module, go to Step 807. Otherwise, repeat Step 803 to Step 805 until the desired resolution of the camera lens module is obtained.

Step 807: Solidify the mixture glue to permanently fix the optical lens module and the optical lens with the image sensor to form the camera lens module.

Accordingly, in the Step 801, in order to assemble the image sensor, at least one optical lens module is pre-assembled. In other words, the relative position of at least one optical lens in the optical lens module is arranged to be adjustable. In this embodiment, the first lens module 101B is the pre-assembled lens module, wherein the assembling position of the first optical lens 111B can be adjusted in at least one direction. In other words, the assembling position of the first optical lens 111B can be adjusted along at least one of the horizontal direction, vertical direction, inclination direction, and circumferential direction. In the third embodiment, the assembling position of the second optical lens 112B in the second optical lens module 102B and the assembling positions of the third optical lens 113B and the fourth optical lens 114B in the third optical lens module 103B are fixed and cannot be adjusted.

In the Step 802, the pre-assembling process of the optical lens module with the image sensor is that the third optical lens module 103B is permanently affixed to the lens base 22B. Then, the second optical lens module 102B is coupled to the third optical lens module 103B via the third adhering element 43B. The first optical lens module 101B is then coupled to the second optical lens module 102B via the second adhering element 42B. The second adhering element 42B and the third adhering element 43B are in semi-solidified state under UV exposure during the pre-assembling process, so as to allow the relative positioning adjustments of the first optical lens module 101B and the second optical lens module 102B for calibration.

Through the Step 803 to Step 805, the camera lens module in the pre-assembling state is electrified for image acquisition, wherein the calibration measurement such as calibration parameter of each of the first optical lens module 101B, the second optical lens module 102B, and the first optical lens 111B is determined through the calibration software. Therefore, the relative assembling positions of the first optical lens module 101B, the second optical lens module 102B, and the first optical lens 111B are individually adjusted with respect to the calibration measurements. The relative positions of the first optical lens module 101B, the second optical lens module 102B, and the first optical lens 111B can be selectively adjusted to align with a centerline of the lens assembly 10B so as to align with the centerline of the photosensitive chip 23B within the deviation range thereof for achieving the acquired image quality of the camera lens module.

It is worth mentioning that the image acquisition is required for every position adjustment of the first optical lens module 101B, the second optical lens module 102B, and the first optical lens 111B. Once the calibration process is completed, the first adhering element 41B, the second adhering element 42B and the third adhering element 43B are heated and solidified to permanently affix the relative positions of the first optical lens module 101B, the second optical lens module 102B, and the first optical lens 111B.

Accordingly, the calibration order can be modified that one of the optical lens module and the optical lens can be selected to be calibrated initially and permanently affixed its relative position via the solidification of the mixture glue. Then, the rest of the pre-assembled components can be calibrated and affixed in sequence. In other words, the pre-assembled components are individually calibrated and affixed the relative position via the solidification of the mixture glue in sequence. It is appreciated that the pre-assembled components can be calibrated individually or together and then affixed the relative positions via the solidification of the mixture glue at the same time.

Figure 9:
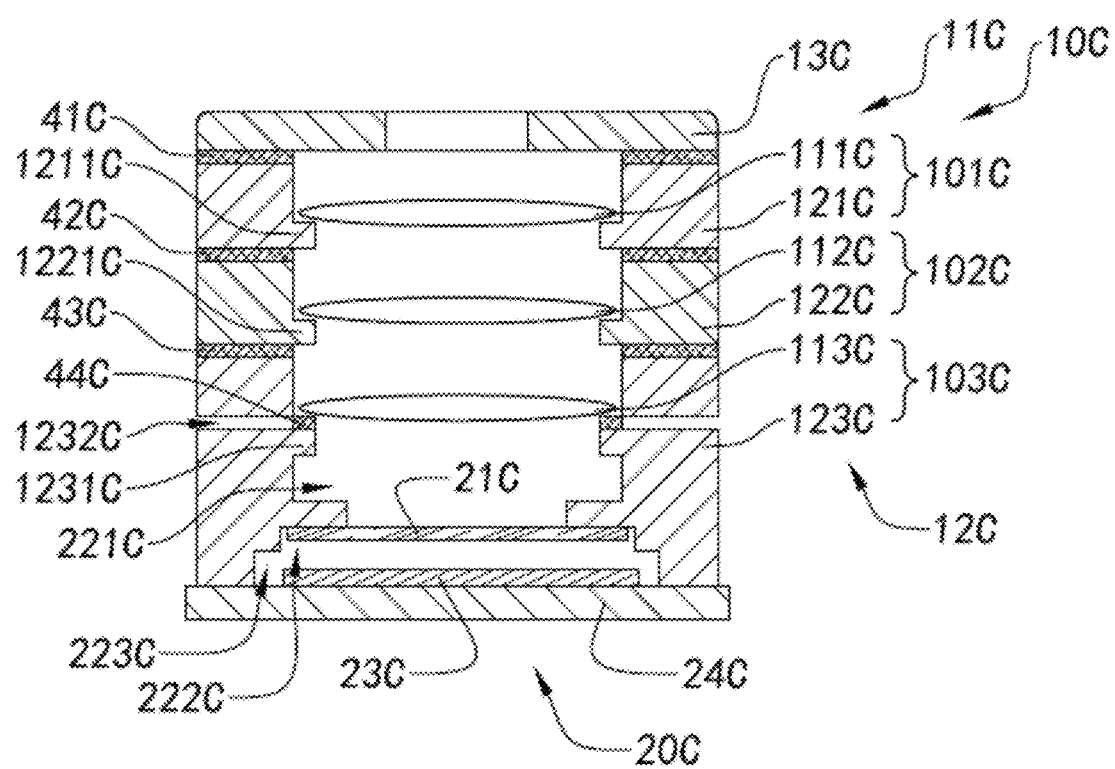
FIG. 9 is a sectional view of the camera lens module with one or more optical lens modules according to a fourth preferred embodiment of the present invention.
Figure 10:
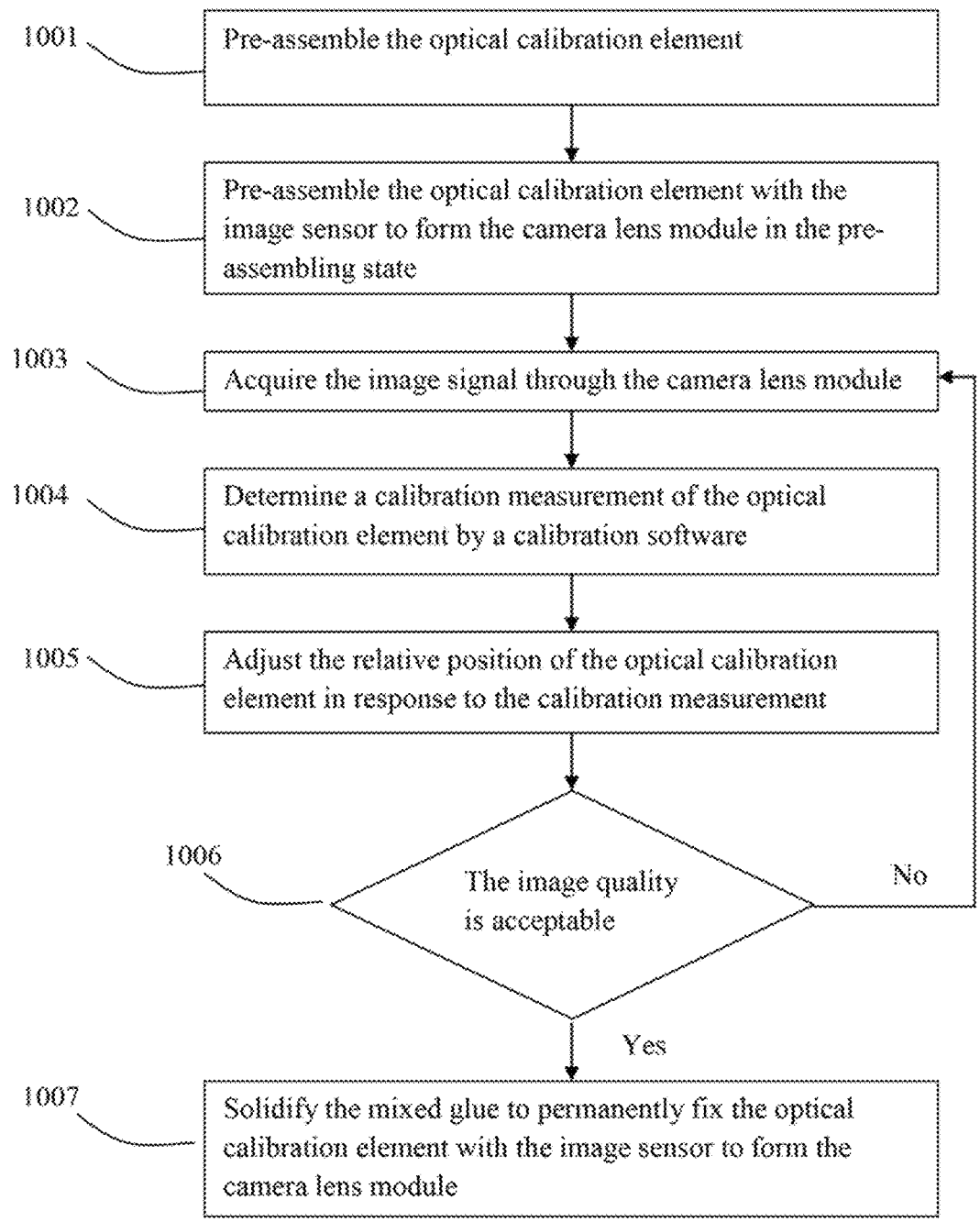
FIG. 10 is a flow diagram illustrating the assembling method of the camera lens module with one or more optical lens modules according to the above fourth preferred embodiment of the present invention.

As shown in FIGS. 9 to 10, a camera lens module according to a fourth embodiment illustrates an alternative mode of the first through third embodiments, wherein the camera lens module comprises a lens assembly 10C and an image sensor 20C, wherein the lens assembly 10C is located along a light path of the image sensor 20C, such that the image sensor 20C can pick up light incident through the lens assembly 10B and can convert the light into image signals. Accordingly, the relative position of the lens assembly 10C to the image sensor 20C is adjustable for achieving the acquired image quality of the camera lens module.

The lens assembly 10C comprises an optical lens set 11C, a lens barrel set 12C, and an aperture member 13C. The optical lens set 11C comprises a first optical lens 111C, a second optical lens 112C, and a third optical lens 113C. The lens barrel set 12C comprises a first lens barrel 121C, a second lens barrel 122C, and a third lens barrel 123C. The aperture member 13C is coupled on a top edge of the first lens barrel 121C. The first optical lens 111C is supported within the first lens barrel 121C via a first positioning unit 1211C which is radially and inwardly extended from an inner barrel wall of the first lens barrel 121C. Accordingly, the first optical lens 111C is mounted in the first lens barrel 121C to form a first optical lens module 101C, wherein the first optical lens module 101C is located at the farther location of the camera lens module where the aperture member 13C is coupled at the top portion of the first optical lens module 101C. In particular, the assembling position of the aperture member 13C with respect to the first optical lens module 101C is adjustable in at least one direction. In other words, the assembling position of the aperture member 13C can be adjusted along at least one of the horizontal direction, vertical direction, inclination direction, and circumferential direction. The second optical lens 112C is supported within the second lens barrel 122C via a second positioning unit 1221C which is radially and inwardly extended from an inner barrel wall of the second lens barrel 122C. Accordingly, the second optical lens 112C is mounted in the second lens barrel 122C to form a second optical lens module 102C. The third optical lens 113C is supported within the third lens barrel 123C via a third positioning unit 1231C which is radially and inwardly extended from an inner barrel wall of the third lens barrel 123C. Accordingly, the third optical lens 113C is mounted in the third lens barrel 123C to form a third optical lens module 103C. It is worth mentioning that the assembling position of the third optical lens 113C with respect to the third lens barrel 123C is adjustable in at least one direction. In other words, the assembling position of the third optical lens 113C can be adjusted along at least one of the horizontal direction, vertical direction, inclination direction, and circumferential direction.

According to the fourth embodiment, the image sensor 20C comprises a color filter 21C, a lens base (i.e. the first lens barrel 123C), a photosensitive chip 23C, and a control circuit board 24C. The color filter 21C is coupled at the first lens barrel 123C at a position above the photosensitive chip 23C. In other words, the color filter 21C is provided along a photosensitive path of the photosensitive chip 23C. The photosensitive chip 23C is operatively coupled on top of the control circuit board 24C.

The third lens barrel 123C has a first holding groove 221C indently formed within an inner surrounding wall of the third lens barrel 123C, a second holding groove 222C indently formed within the inner surrounding wall of the third lens barrel 123C, and a third holding groove 223C indently formed within the inner surrounding wall of the third lens barrel 123C. The first holding groove 221C, the second holding groove 222C, and the third holding groove 223C are formed at the upper portion, mid-portion, and the lower portion of the third lens barrel 123C respectively. The color filter 21C is supported by the second holding groove 222C. The photosensitive chip 23C is supported by the third holding groove 223C and is operatively coupled on the top side of the control circuit board 24C. The control circuit board 24C is coupled at the bottom side of the third lens barrel 123C, wherein the photosensitive chip 23C picks up light incident from the lens assembly 10C and converts the light into image signals.

It is worth mentioning that the aperture member 13C is coupled at the first lens barrel 121C via the first adhering element 41C. The first optical lens module 101C is coupled at the second optical lens module 102C via the second adhering element 42C. The second optical lens module 102C is coupled at the third optical lens module 103C via the third adhering element 43C. The third optical lens 113C is supported within the third lens barrel 123C via the fourth adhering element 44C. According to the fourth embodiment, the aperture member 13C, the first optical lens module 101C, the second optical lens module 102C, the third optical lens module 103C, and the third optical lens 113C serve as the optical elements to be calibrated. Therefore, the relative assembling positions of the aperture member 13C, the first optical lens module 101C, the second optical lens module 102C, the third optical lens module 103C, and the third optical lens 113C are adjustable for calibration. In other words, through the first through fourth adhering elements 41C, 42C, 43C, 44C in a semi-solidified state under the UV exposure, the relative positions of the aperture member 13C, the first optical lens module 101C, the second optical lens module 102C, the third optical lens module 103C, and the third optical lens 113C are adjustable during the pre-assembling process. The first through fourth adhering elements 41C, 42C, 43C, 44C in a semi-solidified state will also able to initially hold the relative positions of the aperture member 13C, the first optical lens module 101C, the second optical lens module 102C, the third optical lens module 103C, and the third optical lens 113C to prevent any unwanted movement so as to simplify the calibration process.

According to the fourth embodiment, the present invention further comprises a method of assembling the camera lens module which comprises the following steps.

Step 1001: Pre-assemble the optical elements to be calibrated.

Step 1002: Pre-assemble the optical elements to be calibrated with the image sensor to form the camera lens module in the pre-assembling state.

Step 1003: Acquire the image signal through the camera lens module.

Step 1004: Determine a calibration measurement including calibration parameter of the optical elements to be calibrated by a calibration software.

Step 1005: Adjust the relative positions of the optical elements to be calibrated with the image sensor in response to the calibration measurement.

Step 1006: When the relative positions of the optical elements to be calibrated are adjusted to obtain a desired resolution of the camera lens module, go to Step 1007. Otherwise, repeat Step 1003 to Step 1005 until the desired resolution of the camera lens module is obtained.

Step 1007: Solidify the mixture glue to permanently fix the optical elements to be optical elements to be calibrated with the image sensor to form the camera lens module.

In the Step 1001 and Step 1002, the optical elements to be calibrated include at least one of the optical lens and the aperture member, and at least one of the optical lens modules. In other words, at least one of the optical lens and the aperture member combines with one optical lens module to serve as the optical elements to be calibrated. The relative positions of the optical elements to be calibrated are adjustable to calibrate the camera lens module. According to the fourth embodiment, the third optical lens 113C, the aperture member 13C, the first optical lens module 101C, the second optical lens module 102C are the optical elements to be calibrated. The relative positions of the third optical lens 113C, the aperture member 13C, the first optical lens module 101C, the second optical lens module 102C are adjusted to align with a centerline of the lens assembly 10C so as to align with the centerline of the photosensitive chip 23C within the deviation range thereof for achieving the acquired image quality of the camera lens module.

In the Step 1101, the assembling tolerance of the optical elements to be calibrated should be controlled for calibration later.

Through the Step 1003 to Step 1005, the camera lens module is electrified for image acquisition, wherein the calibration measurement such as calibration parameter of the optical elements to be calibrated is determined through the calibration software, such that the optical elements to be calibrated can be calibrated in response to the calibration measurement.

The calibration process of the optical elements to be calibrated comprises the following steps.

(1) The camera lens module is electrified for image acquisition, wherein the calibration measurement of the third optical lens 113C is determined through the calibration software, such that the third optical lens 113C can be calibrated in response to the calibration measurement. In other words, the assembling position of the third optical lens 113C is adjusted to align a centerline of the third optical lens 113C with the centerline of the photosensitive chip 23C within the deviation range thereof for achieving the acquired image quality of the camera lens module. If the calibration of the third optical lens 113C cannot achieve the acquired image quality, the calibration process of the third optical lens 113C will repeat until the acquired image quality is achieved. The image acquisition is required for every position adjustment of the third optical lens 113C, such that each calibration of the third optical lens 113C is based on the previous image acquisition. Once the calibration of the third optical lens 113C is completed, the fourth adhering element 44C is solidified to permanently affix the assembling position of the third optical lens 113C.

(2) The camera lens module is electrified for image acquisition, wherein the calibration measurement such as calibration parameter of the second optical lens module 102C is determined through the calibration software, such that the second optical lens module 102C can be calibrated in response to the calibration measurement. In other words, the assembling position of the second optical lens module 102C is adjusted to align a centerline of the second optical lens module 102C with the centerline of the photosensitive chip 23C within the deviation range thereof for achieving the acquired image quality of the camera lens module. If the calibration of the second optical lens module 102C cannot achieve the acquired image quality, the calibration process of the second optical lens module 102C will repeat until the acquired image quality is achieved. The image acquisition is required for every position adjustment of the second optical lens module 102C, such that each calibration of the second optical lens module 102C is based on the previous image acquisition. Once the calibration of the second optical lens module 102C is completed, the third adhering element 43C is solidified to permanently affix the assembling position of the second optical lens module 102C.

(3) The camera lens module is electrified for image acquisition, wherein the calibration measurement such as calibration parameter of the first optical lens module 101C is determined through the calibration software, such that the first optical lens module 101C can be calibrated in response to the calibration measurement. In other words, the assembling position of the first optical lens module 101C is adjusted to align a centerline of the first optical lens module 101C with the centerline of the photosensitive chip 23C within the deviation range thereof for achieving the acquired image quality of the camera lens module. If the calibration of the first optical lens module 101C cannot achieve the acquired image quality, the calibration process of the first optical lens module 101C will repeat until the acquired image quality is achieved. The image acquisition is required for every position adjustment of the first optical lens module 101C, such that each calibration of the first optical lens module 101C is based on the previous image acquisition. Once the calibration of the first optical lens module 101C is completed, the second adhering element 42C is solidified to permanently affix the assembling position of the first optical lens module 101C.

(4) The camera lens module is electrified for image acquisition, wherein the calibration measurement such as calibration parameter of the aperture member 13C is determined through the calibration software, such that the aperture member 13C can be calibrated in response to the calibration measurement. In other words, the assembling position of the aperture member 13C is adjusted to align a centerline of the aperture member 13C with the centerline of the photosensitive chip 23C within the deviation range thereof for achieving the acquired image quality of the camera lens module. If the calibration of the aperture member 13C cannot achieve the acquired image quality, the calibration process of the aperture member 13C will repeat until the acquired image quality is achieved. The image acquisition is required for every position adjustment of the aperture member 13C, such that each calibration of the aperture member 13C is based on the previous image acquisition. Once the calibration of the aperture member 13C is completed, the first adhering element 41C is solidified to permanently affix the assembling position of the aperture member 13C.

After the calibrations, the relative assembling positions of the third optical lens 113C, the aperture member 13C, the first optical lens module 101C, the second optical lens module 102C are permanently fixed to form the camera lens module.

Each of the first adhering element 41C, the second adhering element 42C, the third adhering element 43C, and the fourth adhering element 44C is preferably a mixture glue comprising UV glue mixed with thermosetting adhesive, wherein the mixture glue is in a semi-solidified state under the UV exposure and is solidified after heat treatment, such as within an oven. Therefore, before the solidification of the mixture glue, the assembling positions of the optical elements to be calibrated can be adjusted.

It is worth mentioning that the calibration software is used for calibrating the relative positions of the third optical lens 113C, the aperture member 13C, the first optical lens module 101C, the second optical lens module 102C based on the sensitivity of the optical lens. Accordingly, the calibration process of the third optical lens 113C, the aperture member 13C, the first optical lens module 101C, the second optical lens module 102C comprises the following steps. Measure the optical characteristics of the camera lens module prior to the calibration, including light eccentricity measurement, light axis inclination angle, and curvature of field. In response to the light eccentricity measurement, light axis inclination angle, and curvature of field corresponding to the relative positions of the third optical lens 113C, the aperture member 13C, the first optical lens module 101C, the second optical lens module 102C, determine the calibration measurements such as calibration parameters of the third optical lens 113C, the aperture member 13C, the first optical lens module 101C, the second optical lens module 102C.

Hereinafter, other embodiments of the present application will be described with reference to FIGS. 11 to 19.

Figure 11:
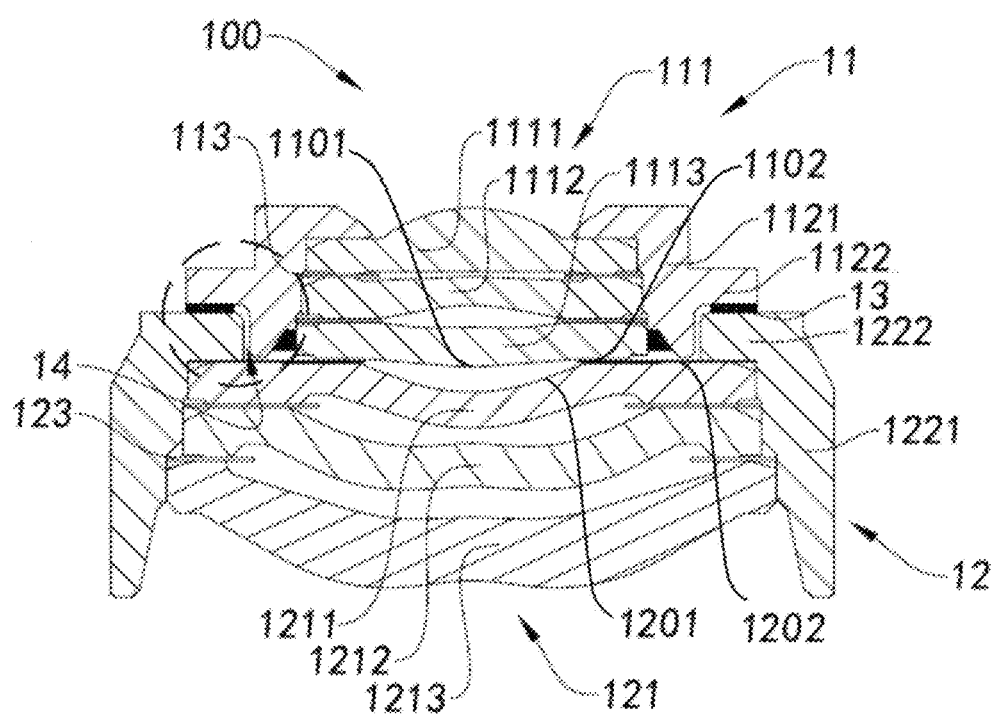
FIG. 11 is a perspective view of a camera lens assembly according to another embodiment of the present application.
Figure 12:
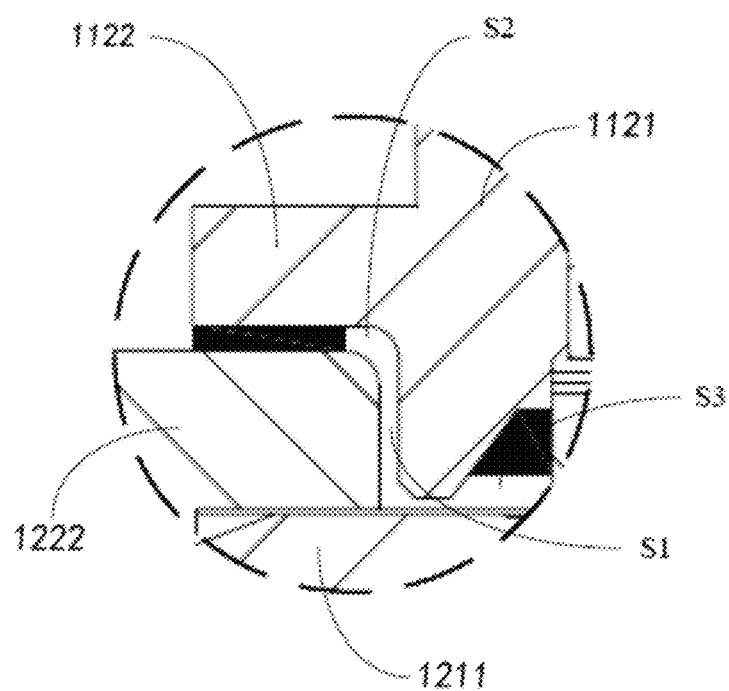
FIG. 12 is a schematic enlarged diagram of a dashed-line part in FIG. 11.

FIG. 11 illustrates a lens assembly 100 according to an implementation of the present application. FIG. 12 is a schematic enlarged diagram of a dashed-line part in FIG. 11. As shown in FIG. 11, the lens assembly 100 may include a first optical lens module 11 and a second optical lens module 12. For the convenience of description, only two optical lens modules are shown in this implementation. However, the present application is not limited thereto, and the lens assembly may include two or more optical lens modules. It should be understood that the first optical lens module 11 shown in FIG. 11 may be referred to as an upper optical lens module, and the second optical lens module 12 may be referred to as a lower optical lens module.

The first optical lens module 11 may include a first carrier (i.e., a first lens barrel) 1121 and at least one first optical lens 111 received in the first carrier 1121. The first carrier 1121 has a hollow structure for accommodating and mounting respective lenses therein so that the lenses are arranged along a light path. The carrier may include all other structures of a non-optical lens. The first optical lenses 111 are arranged in sequence in the first carrier 1121 along the light path. In this implementation, there may be three first optical lenses 111, namely, an uppermost lens 1111, a middle lens 1112, and a lowermost lens 1113. However, the present application is not limited thereto, and the number of the first optical lenses 111 may be one, two, three, or more.

The second optical lens module 12 may include a second carrier (i.e., a second lens barrel) 1221, and at least one second optical lens 121 received in the second carrier 1221. The second carrier 1221 is a hollow structure for accommodating and mounting lenses therein so that the lenses are arranged along a light path. The second optical lenses 121 are arranged in sequence in the second carrier 1221 along the light path. In this implementation, there may be three second optical lenses 121, namely, an uppermost lens 1211, a middle lens 1212, and a lowermost lens 1213. However, the present application is not limited thereto, and the number of the second optical lenses 121 may be one, two, three, or more.

The second optical lens module 12 may further include a bearing portion 1222 connected to the second carrier 1221. The bearing portion 1222 is connected to (for example, integrally connected to) the second carrier 1221 so as to cooperate with the first carrier 1121 of the first optical lens module 11, and is used for bearing the first carrier 1121 or the first optical lenses 111 of the first optical lens module 11. The bearing portion 1222 may be a hollow structure extending inward, so as to provide a lapping and supporting position for the first optical lens module 11, and provide a light path for the second optical lenses 121 in the second carrier 1221.

As shown in FIG. 11, when the first optical lens module 11 and the second optical lens module 12 are assembled together, an adjustable clearance may exist between the first carrier 1121 of the first optical lens module 11 and the bearing portion 1222 of the second optical lens module 12, so as to provide a space for horizontal adjustment of the first optical lens module 11 and the second optical lens module 12. In an implementation, an adjustable clearance S1 may exist between an outer peripheral surface of the first carrier 1121 of the first optical lens module 11 and an inner peripheral surface of the bearing portion 1222 of the second optical lens module 12 (referring to the schematic enlarged diagram of the dashed-line part in FIG. 11).

As shown in FIG. 11, when the first optical lens module 11 and the second optical lens module 12 are assembled together, an adjustable clearance S3 may exist between the first carrier 1121 and a top surface of the uppermost lens 1211 of the second optical lenses 121 and between a bottom surface of the lowermost lens 1113 of the first optical lenses 111 and the top surface of the uppermost lens 1211 of the second optical lenses 121 (referring to the schematic enlarged diagram of the dashed-line part in FIG. 11), so as to provide a space for vertical adjustment of the first optical lens module 11 and the second optical lens module 12.

According to this implementation, an adjustable clearance may exist both between the outer peripheral surface of the first carrier 1121 and the inner peripheral surface of the bearing portion 1222 and between the bottom surface of the lowermost lens 1113 of the first optical lenses 111 and the top surface of the uppermost lens 1211 of the second optical lenses 121. By reserving the adjustable clearance before assembly, an adjustment space allowing for six degrees of freedom can be provided for the first optical lens module and the second optical lens module during the assembly process.

It should be understood that the first optical lens module 11 and the second optical lens module 12 may be assembled together in various manners. In an implementation, the first optical lens module 11 and the second optical lens module 12 may be arranged in sequence along a same optical axis. In an implementation, when the optical lens modules are assembled together, an optical axis direction of lenses in the first optical lens module 11 may be parallel to an optical axis direction of lenses in the second optical lens module 12.

In an implementation, after the first optical lens module 11 and the second optical lens module 12 are assembled together, a central axis of the first optical lens module 11 may be staggered with respect to a central axis of the second optical lens module 12 by 0 to 15 µm. Herein, referring to FIG. 11, for the convenience of measurement, the central axis of the first optical lens module 11 may be construed as a central axis of an optical surface 1101 in the first optical lens module 11 closest to the second optical lens module 12, or may be construed as a central axis defined by a structural surface 1102 of the lens 1113 closest to the second optical lens module 12. When the lowermost lens 1113 and the first carrier 1121 (for example, a lens barrel) of the first optical lens module 11 are tightly assembled, the central axis of the first optical lens module 11 may also be construed as a central axis defined by an inner side surface of the first carrier.

Similarly, for the convenience of measurement, the central axis of the second optical lens module 12 may be construed as a central axis of an optical surface 1201 in the second optical lens module 12 closest to the first optical lens module 11, or may be construed as a central axis defined by a structural surface 1202 of the uppermost lens 1211 closest to the first optical lens module 11. When the uppermost lens 1211 and the second carrier 1221 (for example, a lens barrel) of the second optical lens module 12 are tightly assembled, the central axis of the second optical lens module 12 may also be construed as a central axis defined by an inner side surface of the second carrier.

In an implementation, the central axis of the first optical lens module 11 may be inclined with respect to the central axis of the second optical lens module 12 by an angle of less than 0.5°.

Still referring to FIG. 11, the first optical lens module 11 may further include an extension portion 1122 extending outward from the first carrier 1121. The extension portion 1122 may extend outward from the outside of the first carrier 1121, so as to be laid on the bearing portion 1222 of the second optical lens module 12. The extension portion 1122 extends outward integrally from the first carrier 1121. In some implementations, the extension portion 1122 may be in the shape of a ring circling the first carrier 1121, and extends outward from the first carrier 1121 to form an annular brim structure, so as to be laid on the bearing portion 1222 of the second optical lens module 12 by means of the annular brim structure, thereby providing stable support for the first optical lens module 11.

Referring to FIG. 11, an adjustable clearance S2 may exist between a bottom surface of the extension portion 1122 of the first optical lens module 11 and the top surface of the bearing portion 1222 of the second optical lens module 12 (referring to the schematic enlarged diagram of the dashed-line part in FIG. 11). When the first optical lens module 11 and the second optical lens module 12 are assembled, a bonding medium may be accommodated in the adjustable clearance, so as to stably fix the first optical lens module 11 and the second optical lens module 12, so that the relative positions of the first optical lens module 11 and the second optical lens module 12 are fixed. The bonding medium is, for example, an UV-cured adhesive, a thermosetting adhesive, an UV-cured thermosetting adhesive, or an epoxy resin adhesive, but the present application is not limited thereto. In an implementation, a width of the bonding medium disposed in a radial direction may be 0.05 to 1.5 mm. Herein, the radial direction refers to a direction perpendicular to the optical axis direction of the lens. For example, in the implementation shown in FIG. 11, the above-mentioned width may be a projection width of the bonding medium applied to the clearance S2 in a horizontal direction.

It should be understood that the first optical lens module 11 and the second optical lens module 12 may be fixed in other methods such as hot welding, ultrasonic welding, and laser welding, and the present application is not limited thereto.

Still referring to FIG. 11, the first optical lens module 11 may include at least one spacer ring 113 disposed in cooperation with the first optical lenses 111 to constrain light passing through the first optical lenses 111 and provide a predetermined light path. The uppermost lens 1111, the middle lens 1112, and the lowermost lens 1113 in the first optical lenses 111 are arranged from top to bottom in the first carrier 1121 along the light path. In this implementation, the first optical lens module 11 is provided with two spacer rings 113, respectively disposed between the uppermost lens 1111 and the middle lens 1112, and between the middle lens 1112 and the lowermost lens 1113. The spacer ring 113 may also be disposed on the first optical lens 111 by means of coating.

In an implementation, the spacer ring 113 may be disposed at a lower portion of the lowermost lens 1113 of the first optical lenses 111, so that an adjustable clearance exists between a bottom surface of the spacer ring 113 and the uppermost lens 1211 of the second optical lenses 21, and between the bottom surface of the spacer ring 113 and the top surface of the bearing portion 1222, when the first optical lens module and the second optical lens module are assembled together.

Further, referring to FIG. 11, the second optical lens module 12 may include at least one spacer ring 123 which is disposed in cooperation with the second optical lenses 121 to constrain light passing through the lenses and provide a predetermined light path. In this implementation, the second optical lens module 12 is provided with three spacer rings 123, respectively disposed at an upper portion of the uppermost lens 1211 of the second optical lenses 121, between the uppermost lens 1211 and the middle lens 1212, and between the middle lens 1212 and the lowermost lens 1213. Because one spacer ring 123 is disposed at the upper portion of the uppermost lens 1211 of the second optical lenses 121, an adjustable clearance exists between a bottom surface of the spacer ring 123 and the top surface of the uppermost lens 1211 and the bearing portion 1222.

In the present application, the adjustable clearance is set according to optical properties of the first optical lenses and the second optical lenses. By setting and reserving the adjustable clearance before assembly, adjustment of six degrees of freedom can be achieved when the first optical lens module and the second optical lens module are assembled together. During the process of assembling the optical lens modules to form the lens assembly, overall optical properties of the lenses in the lens assembly may be adjusted by means of active calibration, so that the adjustable clearance is formed into a curing clearance. During batch production of the lens assembly, each product may have a different curing clearance.

In an implementation, the size of the curing clearance causes an allowable angle of inclination of the first optical lens module with respect to the second optical lens module to be less than or equal to 0.5°. It should be understood that the above-mentioned angle of inclination may include an allowable angle of inclination of six degrees of freedom of the first optical lens module in a three-dimensional space with respect to the second optical lens module. The six degrees of freedom refer to degrees of freedom of moving along three coordinate axes x, y, and z and degrees of freedom of rotating about the three coordinate axes in a three-dimensional space.

Referring to FIG. 11, a lower portion of the first carrier 1121 of the first optical lens module 11 further has a reinforcing and fixing groove 112112 at a position corresponding to the lens at the lower portion of the first optical lens. The reinforcing and fixing groove is used for accommodating the bonding medium 13, to reinforce and fix the first optical lens 111 located at the bottom end, for example, the lowermost lens 1113. In an implementation, the reinforcing and fixing groove 112112 may correspond to the outermost first optical lens 111. For example, if there are two lenses (for example, an upper lens and a lower lens) in the first carrier 1121, the reinforcing and fixing groove 112112 may reinforce and fix the lower lens. If there are four lenses in the first carrier 1121, the reinforcing and fixing groove 112112 may reinforce and fix the fourth lens that is lowermost.

Preferably, in some embodiments, the reinforcing and fixing groove 112112 is symmetrically distributed at a lower end portion of the first carrier 1121, to provide a uniform force to the corresponding first optical lenses 111, so as to prevent the first optical lenses 111 from receiving a non-uniform acting force from the bonding medium 13 when the bonding medium 13 changes due to an environmental effect, for example, when the bonding medium 13 expands due to heat.

The reinforcing and fixing groove 112112 may be designed into different shapes according to requirements. The shape of the cross-section of the reinforcing and fixing groove 112112 is, for example, wedge-shaped, triangular, trapezoidal, or rectangular. The reinforcing and fixing groove 112112 may be disposed separately at intervals, or may be a communicated groove, that is to say, an integral annular groove. The cross-section of the annular groove may be of different shapes.

Preferably, a depth of the reinforcing and fixing groove 112112 is smaller than a thickness of an edge of the corresponding lowermost lens, so as to prevent the formation of a clearance between the reinforcing and fixing groove 112112 and the edge of the top surface of the lens and thus prevent the adhesive from entering into the lens assembly by the clearance.

In this implementation and FIG. 11, the reinforcing and fixing groove 112112 has a trapezoidal structure, and there are four reinforcing and fixing grooves 112112 symmetrically distributed. Definitely, in other implementations of the present application, the reinforcing and fixing groove 112112 may also be in other shapes, and the number of the reinforcing and fixing grooves 112112 may be, for example, three, five, or more, and the present application is not limited thereto.

In an implementation, the reinforcing and fixing groove 112112 may also have an annular structure (not shown) having an inclined annular inner wall, to facilitate the application of the bonding medium 13. That is, the reinforcing and fixing groove 112112 can provide a large opening, to facilitate the addition of the bonding medium 13 using, for example, a syringe needle, and prevent the bonding medium 13 from staining the surface of the corresponding first optical lenses 111. In addition, the bonding medium 13 can flow to a side edge of the corresponding first optical lens 111 along the inclined annular structure, so as to stably fix the side edge of the first optical lens 111.

In an implementation, the depth of the reinforcing and fixing groove may be greater than or equal to 0.15 mm. In an implementation, an opening width of the reinforcing and fixing groove may be greater than or equal to 0.2 mm. In an implementation, a wall thickness of the reinforcing and fixing groove may be greater than or equal to 0.1 mm.

In an implementation, the first carrier 1121 of the first optical lens module 11 may include a reinforcing and fixing region (not shown) running through a side wall of the first carrier 1121, to accommodate the bonding medium 13, so as to reinforce and fix the first optical lenses 111.

Figure 13:
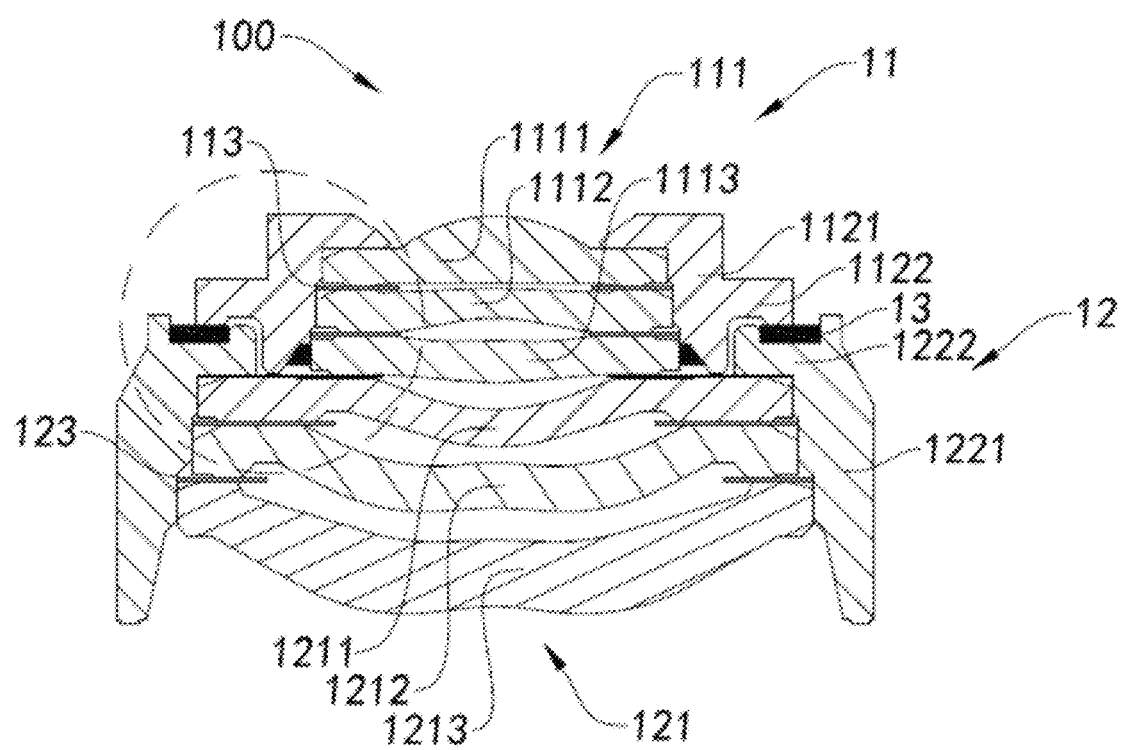
FIG. 13 is a perspective view of a lens assembly according to another embodiment of the present application.
Figure 14:
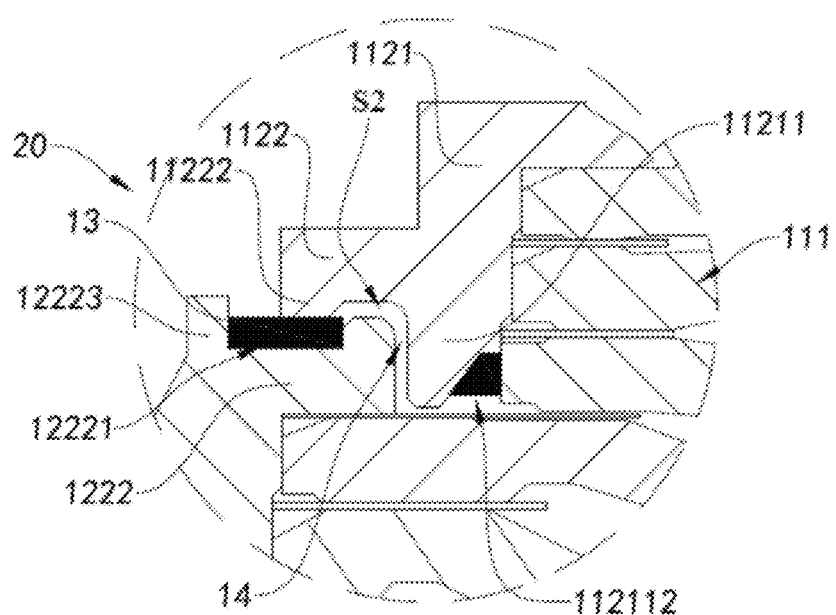
FIG. 14 is a perspective enlarged diagram of a dashed-line part in FIG. 13.

FIG. 13 illustrates a lens assembly 100 according to another implementation of the present application. FIG. 14 is a schematic enlarged diagram of a dashed-line part in FIG. 13. As shown in FIG. 13 and FIG. 14, the lens assembly 100 may include a first optical lens module 11 and a second optical lens module 12.

The first optical lens module 11 may include a first carrier 1121 and at least one first optical lens 111 received in the first carrier 1121. There may be three first optical lenses 111, namely, an uppermost lens 1111, a middle lens 1112, and a lowermost lens 1113. The second optical lens module 12 may include a second carrier 1221, and at least one second optical lens 121 received in the second carrier 1221. There may be three second optical lenses 121, namely, an uppermost lens 1211, a middle lens 1212, and a lowermost lens 1213.

The second optical lens module 12 may further include a bearing portion 1222 connected to the second carrier 1221 so as to cooperate with the first carrier 1121 of the first optical lens module 11, and is used for bearing the first carrier 1121 or the first optical lenses 111 of the first optical lens module 11. The first optical lens module 11 may further include an extension portion 1122 extending outward from the first carrier 1121, so as to be laid on the bearing portion 1222 of the second optical lens module 12.

Except for the extension portion 1122 and the bearing portion 1222, the lens assembly 100 shown in FIG. 13 is basically the same as the lens assembly 100 shown in FIG. 11, and therefore other components will not be repeatedly described here.

As shown in FIG. 13 and FIG. 14, the extension portion 1122 of the first carrier 1121 may include a projecting portion 11222 projecting downward. The bearing portion 1222 of the second optical lens module 12 includes a matching groove 12221 recessed downward. When the extension portion 1122 is laid on the bearing portion 1222, the projecting portion 11222 may be located inside the matching groove 12221, and a clearance may exist between the projecting portion 11222 and the matching groove 12221.

In this implementation, when the first optical lens module 11 and the second optical lens module 12 are assembled together, an adjustable clearance 14 may exist between an outer peripheral surface of the first carrier 1121 of the first optical lens module 11 and an inner peripheral surface of the bearing portion 1222 of the second optical lens module 12, so as to provide a space for horizontal adjustment of the first optical lens module 11 and the second optical lens module 12. An adjustable clearance may exist between the first carrier 1121 and a top surface of the uppermost lens 1211 of the second optical lenses 121, and between a bottom surface of the lowermost lens 1113 of the first optical lenses 111 and the top surface of the uppermost lens 1211 of the second optical lenses 121, so as to provide a space for vertical adjustment of the first optical lens module 11 and the second optical lens module 12. By reserving the adjustable clearance before assembly, an adjustment space allowing for six degrees of freedom can be provided for the first optical lens module and the second optical lens module during the assembly process.

In an implementation, the matching groove 12221 may accommodate a bonding medium 13, so as to fix the first optical lens module 11 and the second optical lens module 12. The projecting portion 11222 may be formed into an annular structure, and the matching groove 12221 may also be formed into an annular structure, so that the projecting portion 11222 and the matching groove 12221 can match each other during assembly.

In an implementation, a width of the matching groove 12221 may be greater than a thickness of the projecting portion 11222 of the extension portion 1122, so as to provide a sufficient space for adjusting the first optical lens module 11 and provide a sufficient space for accommodating the bonding medium 13, so that the first optical lens module 11 and the second optical lens module 12 can be stably fixed.

Referring to FIG. 13 and FIG. 14, an upper portion of the bearing portion 1222 further includes, on an outer side thereof, a bump 12223 extending upward, to stop the bonding medium 13 from flowing to the inner or outer side, thereby preventing the bonding medium 13 from staining the internal lenses or affecting the overall appearance.

Further, preferably, a top end of the bump 12223 located on the outer side is higher than a matching wall 12222 located on the inner side, so as to prevent the bonding medium 13 accommodated in the matching groove 12221 from overflowing to the outside, thereby ensuring a clean appearance.

In this implementation, a lower portion of the first carrier 1121 of the first optical lens module 11 further has a reinforcing and fixing groove 112112 at a position corresponding to the first optical lens located at the lower portion. The reinforcing and fixing groove is used for accommodating a bonding medium 13, to reinforce and fix the first optical lens 111 located at the bottom end, for example, the lowermost lens 1113.

Figure 15:
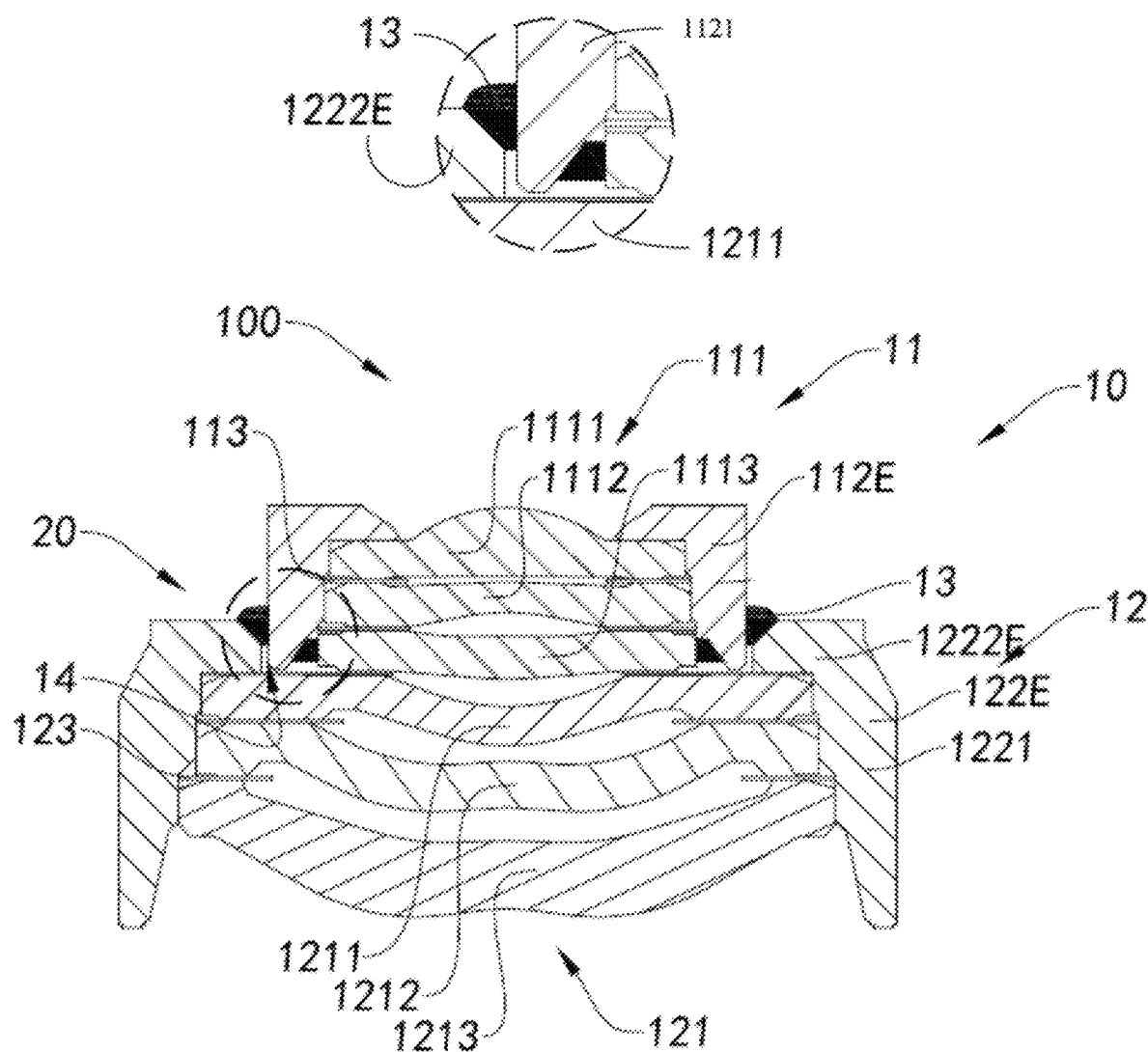
FIG. 15 is a perspective view of a lens assembly according to still another embodiment of the present application, where details of a dashed-line part are illustrated using a perspective enlarged diagram.

FIG. 15 illustrates a lens assembly 100 according to still another implementation of the present application. As shown in FIG. 15, the lens assembly 100 may include a first optical lens module 11 and a second optical lens module 12. The first optical lens module 11 may include a first carrier 1121 and at least one first optical lens 111 received in the first carrier 1121. There may be three first optical lenses 111, namely, an uppermost lens 1111, a middle lens 1112, and a lowermost lens 1113.

The second optical lens module 12 may include a second carrier 1221, and at least one second optical lens 121 received in the second carrier 1221. There may be three second optical lenses 121, namely, an uppermost lens 1211, a middle lens 1212, and a lowermost lens 1213.

The lens assembly 100 shown in FIG. 15 is basically the same as the lens assembly 100 shown in FIG. 11 except for the bearing portion and the extension portion, and therefore other components will not be repeatedly described here.

In this implementation, the second optical lens module 12 may further include a bearing portion 1222E, which is connected to the second carrier 1221 so as to cooperate with the first carrier 1121 of the first optical lens module 11, and is used for bearing the first carrier 1121 of the first optical lens module 11.

The bearing portion 1222E of the second optical lens module 12 is a hollow structure extending inward. A lower end portion of the first carrier 1121 extends to the bearing portion 1222E of the second optical lens module 12, so as to constrain the relative positions of the first optical lens module 11 and the second optical lens module 12.

When the first optical lens module 11 and the second optical lens module 12 are assembled together, a clearance exists between opposite side surfaces of the first carrier 1121 and the bearing portion 1222E, that is, an outer peripheral surface of the first carrier 1121 and an inner peripheral surface of the bearing portion 1222E. As shown in FIG. 15, the bonding adhesive 13 may be applied into the clearance, to fix the first optical lens module 11 and the second optical lens module 12. The first carrier 1121 may also be fixed to the second optical lens module 12 by welding, for example, laser welding or ultrasonic welding.

In addition, when the first optical lens module 11 and the second optical lens module 12 are assembled together, an adjustable clearance may exist between a bottom surface of the first carrier 1121 and the lowermost lens 1113 of the first optical lenses 111, and a top surface of the uppermost lens 1211 of the second optical lenses 121. In the present application, the adjustable clearance is set according to optical properties of the first optical lenses and the second optical lenses. By setting and reserving the adjustable clearance before assembly, adjustment of six degrees of freedom can be achieved when the first optical lens module and the second optical lens module are assembled together.

Figure 16:
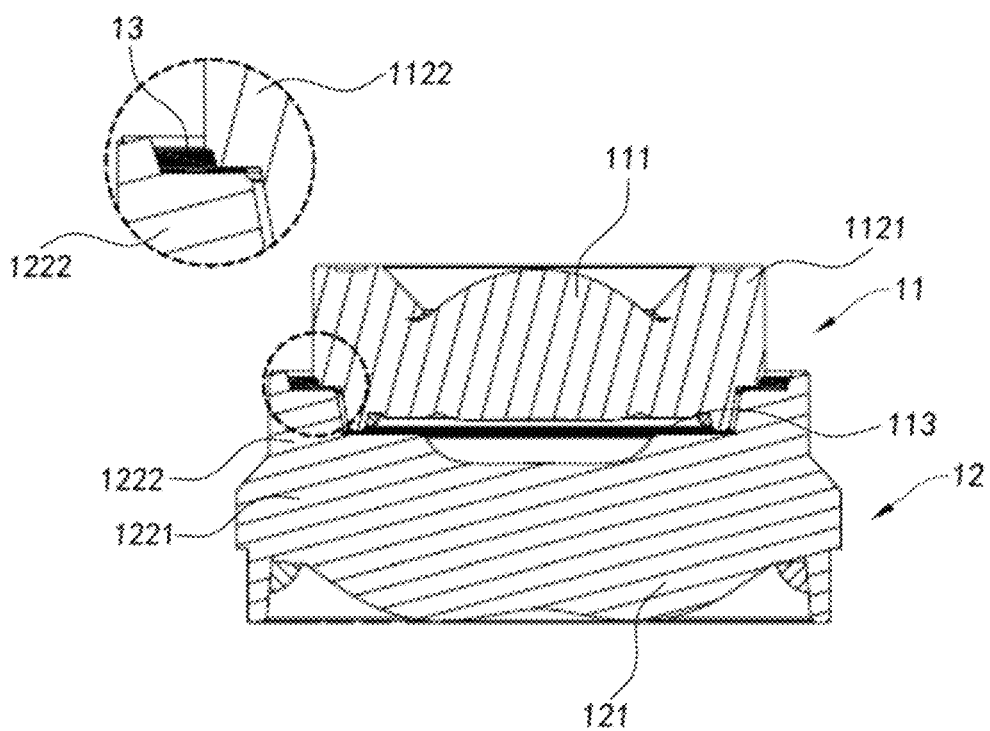
FIG. 16 is a perspective view of a lens assembly according to a variant embodiment of the present application, where details of a dashed-line part are illustrated using a perspective enlarged diagram.

FIG. 16 illustrates a lens assembly 100 according to a variant implementation of the present application, including a schematic enlarged diagram of a dashed-line part. In FIG. 16, to show the relationship between the first optical lens module and the second optical lens module when the lens assembly is complete, the lenses and the lens barrel are not clearly distinguished.

In this implementation, there is only one first optical lens 111, that is, the lens may be construed as the lowermost lens of the first optical lenses 111. There is only one second optical lens 121, that is, the lens may be construed as the uppermost lens of the second optical lenses 121 in this implementation.

In this implementation, the bottom surface of the extension portion 1122 of the first optical lens module 11 is flat, and the upper surface of the bearing portion 1222 of the second optical lens module 12 is also flat, wherein the matching groove shown in FIG. 14 is not included. The extension portion 1122 may be laid on the bearing portion 1222, as shown by the schematic enlarged diagram in FIG. 16. An adjustable clearance may exist between the bottom surface of the extension portion 1122 and the bearing portion 1222.

In an implementation, the clearance between the bottom surface of the extension portion 1122 and the bearing portion 1222 may accommodate a bonding medium 13, so as to fix the first optical lens module 11 and the second optical lens module 12. In this implementation, adjustment is performed between the bottom surface of the extension portion extending from the side portion of the first carrier 1121 and the surface of the bearing portion 1222 of the second optical lens module 12.

In this implementation, when the first optical lens module 11 and the second optical lens module 12 are assembled together, an adjustable clearance exists between the first carrier 1121 and the bearing portion 1222 of the second optical lens module 12. The adjustable clearance includes: in the part of the first carrier 1121 which is laid on the bearing portion 1222 of the second optical lens module 12, a clearance between the bottom surface of the first carrier 1121 and the top surface of the bearing portion 1222; and a clearance between opposite side surfaces of the first carrier 1121 and the bearing portion 1222. In addition, an adjustable clearance may also exist between the bottom surface of the first carrier 1121 and the top surface of the second optical lens 121, and between the bottom surface of the first optical lens 111 and the top surface of the second optical lens 121.

As shown in FIG. 16, the spacer ring 113 may be disposed below the first optical lens 111, so that when the first optical lens module 11 and the second optical lens module 12 are assembled together, an adjustable clearance may exist between the bottom surface of the spacer ring 113 and the top surface of the second optical lens 121. The adjustable clearance is set according to optical properties of the first optical lenses 111 and the second optical lenses 121. By setting and reserving the adjustable clearance before assembly, an adjustment space allowing for six degrees of freedom can be provided for the first optical lens module and the second optical lens module when the first optical lens module 11 and the second optical lens module 12 are assembled together.

A bonding medium may be applied into the clearance between the first carrier 1121 and the part of the second carrier 1221 laid on the bearing portion 1222, so as to fix the first optical lens module 11 and the second optical lens module 12, so that the relative positions of the first optical lens module 11 and the second optical lens module 12 are fixed. When the optical lens modules are assembled to form the lens assembly, overall optical properties of the lenses in the lens assembly may be adjusted by means of active calibration, so that the adjustable clearance is formed into a curing clearance.

Figure 17:
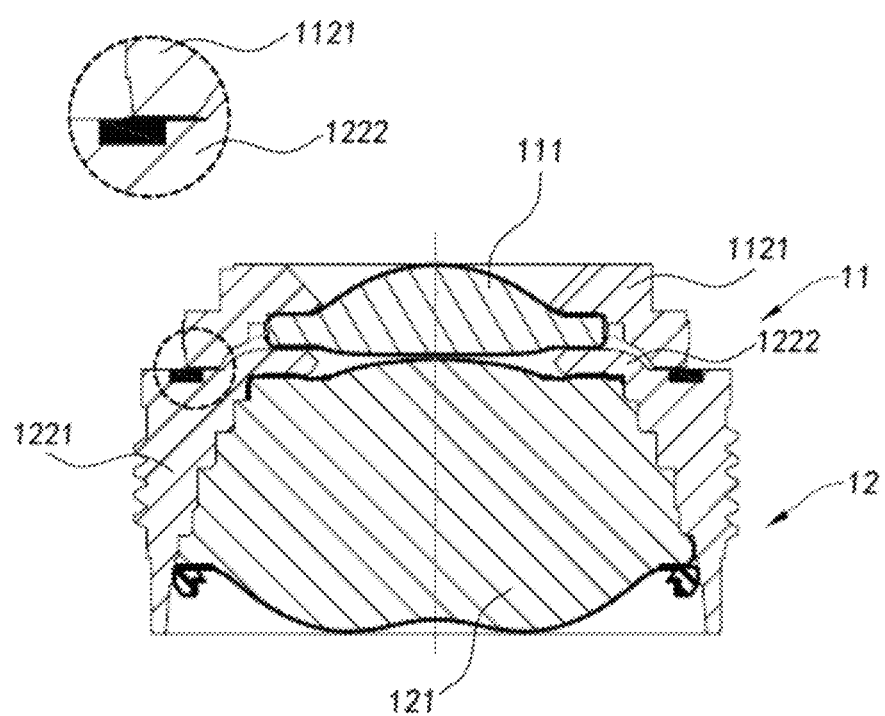
FIG. 17 is a perspective view of a lens assembly according to a variant embodiment of the present application, where details of a dashed-line part are illustrated using a perspective enlarged diagram.

FIG. 17 illustrates a lens assembly 100 according to a variant implementation of the present application, including a schematic enlarged diagram of a dashed-line part.

In this implementation, there is only one first optical lens 111, that is, the lens may be construed as the lowermost lens of the first optical lenses 111. There is only one second optical lens 121, that is, the lens may be construed as the uppermost lens of the second optical lenses 121 in this implementation. The bearing portion 1222 of the second optical lens module 12 is connected to the second carrier 1221 and extends into inside of the second carrier 1221, so as to provide support for the first optical lens module 11 and the first optical lens 111, and provide a light path for the second optical lens 121 in the second carrier 1221.

In this implementation, the bearing portion 1222 of the second carrier 1221 bears the first carrier 1121 and the first optical lens 111. When the first optical lens module 11 and the second optical lens module 12 are assembled together, an adjustable clearance may exist between the bottom surface of the first carrier 1221 and the top surface of the bearing portion 1222, between the bottom surface of the first optical lens 111 and the top surface of the bearing portion 1222, and between the bottom surface of the first optical lens 111 and the top surface of the second optical lens 121. The adjustable clearance is set according to optical properties of the first optical lenses 111 and the second optical lenses 121. By setting and reserving the adjustable clearance before assembly, an adjustment space allowing for six degrees of freedom can be provided for the first optical lens module and the second optical lens module when the first optical lens module 11 and the second optical lens module 12 are assembled together.

A bonding medium may be applied into the clearance between the first carrier 1121 and the part of the second carrier 1221 laid on the bearing portion 1222, so as to fix the first optical lens module 11 and the second optical lens module 12, so that the relative positions of the first optical lens module 11 and the second optical lens module 12 are fixed. When the optical lens modules are assembled to form the lens assembly, overall optical properties of the lenses in the lens assembly may be adjusted by means of active calibration, so that the adjustable clearance is formed into a curing clearance.

In the above-mentioned implementations, different structures are described by using the lens assemblies 100 formed by two optical lens modules as an example. It should be understood that in other implementations, the lens assembly 100 may be assembled of three or more optical lens modules, the assembly method may be a combination of different implementations, and the present application is not limited to one assembly method.

Figure 18:
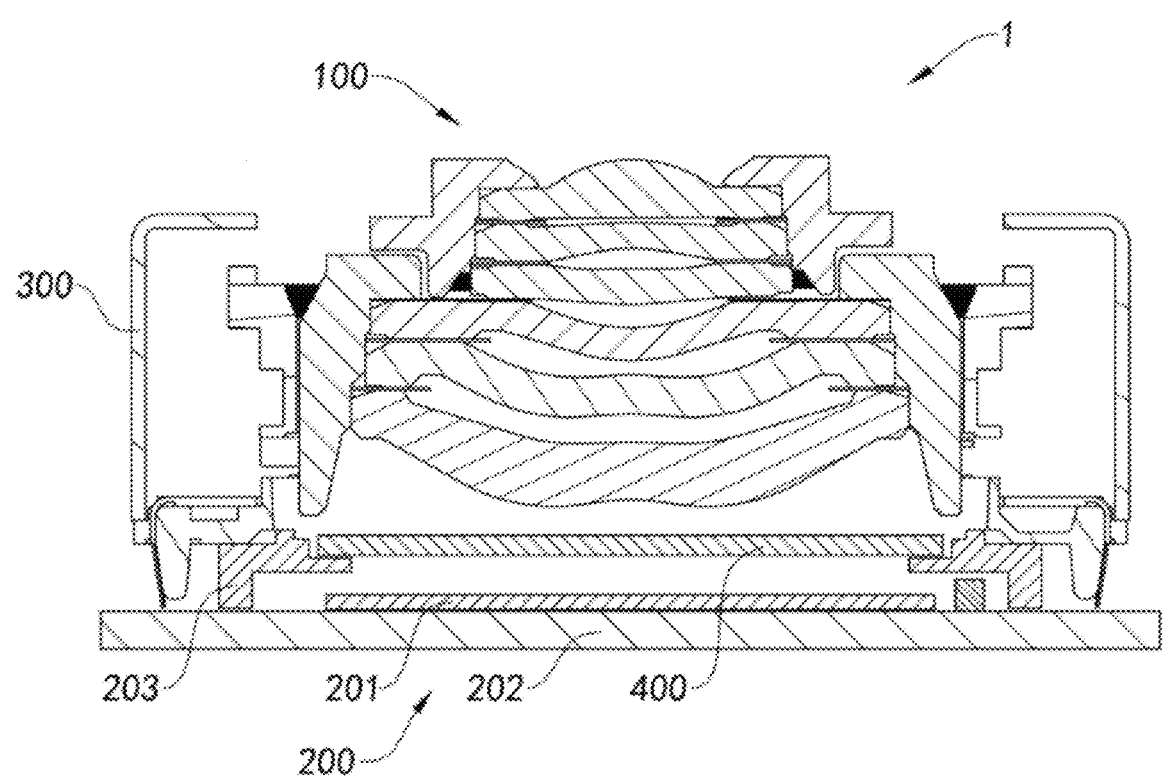
FIG. 18 is a perspective view of a camera lens module formed by a lens assembly according to an embodiment of the present application.

FIG. 18 illustrates a camera lens module 1 formed by a lens assembly 100 according to a preferred embodiment of the present application. The camera lens module 1 may be an autofocus camera lens module. In an implementation, the camera lens module 1 may be a fixed-focus camera lens module. The camera lens module 1 may include a lens assembly 100, a photosensitive chip 200, and a driving element 300. The lens assembly 100 is located in a path of sensing light of the photosensitive chip 200, so that the photosensitive chip 200 senses light and acquires image information. The lens assembly 100 is mounted on the driving element 300, so that a focal length of the camera lens module 1 can be adjusted by adjusting the lens assembly 100. The lens assembly 100 may be the lens assembly according to any one of the implementations of the present application. The driving element 300 may be, for example, but not limited to, a voice coil motor or a piezoelectric motor. The driving element 300 is electrically connected to the photosensitive chip 200.

In this implementation, the photosensitive chip 200 may include a photosensitive element 201, a circuit board 202, and a lens base 203. The photosensitive element 201 is electrically connected to the circuit board 202. For example, the photosensitive element 201 is disposed on the circuit board 202 by surface mounting, and is electrically connected to the circuit board 202 by an electric connecting line. The lens base 203 is mounted on the circuit board 202. The driving element 300 is mounted on the lens base 203, so that the lens assembly 100 is located in a light path of the photosensitive element 201.

The camera lens module 1 may further include a filter element 400. The filter element 400 is mounted on the lens base 203 and between the lens assembly 100 and the photosensitive element 201. That is to say, light incident from the lens assembly 100 is filtered by the filter element 400 and then reaches the photosensitive element 201. The filter element 400 may be, for example, but not limited to, an infrared cut-off filter or a blue glass filter.

Figure 19:
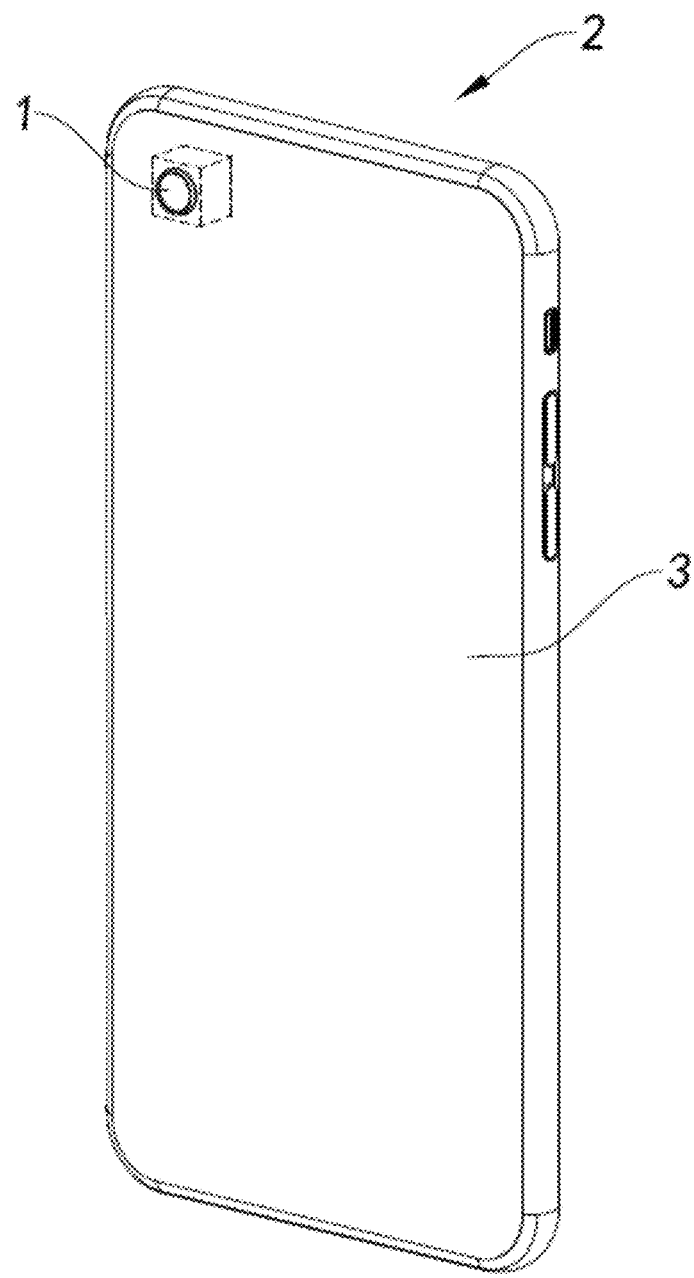
FIG. 19 is a perspective view of an application of a camera lens module having a lens assembly according to an embodiment of the present application.

Referring to FIG. 19, the lens assembly 100 may be assembled and applied to different types of camera lens modules 1, and the camera lens module 1 may be applied to an electronic device 2. The electronic device 2 is, for example, but not limited to, a smart phone, a wearable device, a computer device, a television, a vehicle, a camera, or a monitoring device. The electronic device 2 may include an electronic device body 3. The camera lens module 1 can be mounted on the electronic device body 3, and is used in combination with the electronic device body 3 to implement image acquisition and reproduction.

The foregoing is only a description of the preferred implementations of the present application and the applied technical principles. It should be appreciated by those skilled in the art that the inventive scope of the present application is not limited to the technical solutions formed by the particular combinations of the above technical features. The inventive scope should also cover other technical solutions formed by any combinations of the above technical features or equivalent features thereof without departing from the concept of the invention, such as, technical solutions formed by replacing the features as disclosed in the present application with (but not limited to), technical features with similar functions.

One skilled in the art will understand that the embodiment of the present invention as shown in the drawings and described above is exemplary only and not intended to be limiting.

It will thus be seen that the objects of the present invention have been fully and effectively accomplished. The embodiments have been shown and described for the purposes of illustrating the functional and structural principles of the present invention and is subject to change without departure from such principles. Therefore, this invention includes all modifications encompassed within the spirit and scope of the following claims.

What is claimed is:

1. A lens assembly, comprising:
   a first optical lens module, comprising a first carrier and at least one first optical lens received in the first carrier; and
   a second optical lens module, comprising a second carrier, at least one second optical lens received in the second carrier, and a bearing portion connected to the second carrier,
   wherein when the first optical lens module and the second optical lens module are assembled together, an adjustable clearance exists between the first carrier and the bearing portion, between a bottom surface of the first carrier and a lowermost lens of the first optical lenses, and between the bottom surface of the first carrier and a top surface of an uppermost lens of the second optical lenses, and
   wherein overall optical properties of the lens assembly are adjusted in six degrees based on the adjustable clearance by means of active calibration, so that the adjustable clearance is formed into a curing clearance.

2. The lens assembly according to claim 1, wherein an adjustable clearance exists between an outer peripheral surface of the first carrier and an inner peripheral surface of the bearing portion.

3. The lens assembly according to claim 1, wherein an adjustable clearance exists between a bottom surface of the first carrier and a top surface of the bearing portion.

4. The lens assembly according to claim 3, wherein an adjustable clearance exists between the bottom surface of the lowermost lens of the first optical lenses and the top surface of the bearing portion of the second optical lens module.

5. The lens assembly according to claim 1, wherein the first optical lens module further comprises an extension portion extending outward from the first carrier, and an adjustable clearance exists between a bottom surface of the extension portion and a top surface of the bearing portion.

6. The lens assembly according to claim 5, wherein a bonding medium is accommodated into the clearance between the bottom surface of the extension portion and the top surface of the bearing portion, so that the first optical lens module and the second optical lens module are fixed together.

7. The lens assembly according to claim 6, wherein a width of the bonding medium disposed in a radial direction is 0.05 to 1.5 mm.

8. The lens assembly according to claim 6, wherein a region of the first carrier corresponding to the bearing portion forms an effective exposure region for the bonding medium, and the exposure region has a width of greater than or equal to 0.1 mm.

9. The lens assembly according to claim 6, wherein the bonding medium is one or more selected from a group consisting of an UV-cured adhesive, a thermosetting adhesive, an UV-cured thermosetting adhesive, and an epoxy resin adhesive.

10. The lens assembly according to claim 5, wherein the extension portion comprises a projecting portion projecting downward, the bearing portion comprises a matching groove recessed downward, and when the extension portion is laid on the bearing portion, the projecting portion is located inside the matching groove.

11. The lens assembly according to claim 1, wherein the first optical lens module comprises at least one spacer ring disposed in cooperation with the first optical lens to provide a predetermined light path, wherein one spacer ring of the at least one spacer ring is disposed at a lower portion of the lowermost lens of the first optical lenses, and an adjustable clearance exists between a bottom surface of the one spacer ring and a top surface of the uppermost lens of the second optical lenses and the bearing portion.

12. The lens assembly according to claim 11, wherein the spacer ring is further disposed between two adjacent first optical lenses.

13. The lens assembly according to claim 1, wherein the second optical lens module comprises at least one spacer ring disposed in cooperation with the second optical lenses to provide a predetermined light path, wherein one spacer ring of the at least one spacer ring is disposed at an upper portion of the uppermost lens of the second optical lenses, and an adjustable clearance exists between the bottom surface of the lowermost lens of the first optical lenses and a top surface of the one spacer ring.

14. The lens assembly according to claim 13, wherein the spacer ring is further disposed between two adjacent second optical lenses.

15. The lens assembly according to claim 1, wherein the curing clearance is set so that an allowable angle of inclination of the first optical lens module with respect to the second optical lens module is less than or equals to 0.5°.

16. The lens assembly according to claim 1, wherein the first carrier of the first optical lens module has a reinforcing and fixing groove, and the reinforcing and fixing groove corresponds to a position of the lowermost lens of the first optical lenses and is used for accommodating a bonding medium to reinforce and fix the lowermost lens.

17. The lens assembly according to claim 16, wherein the first carrier of the first optical lens module has a reinforcing and fixing region, and the reinforcing and fixing region runs through a side wall of the first carrier and is used for accommodating a bonding medium to reinforce and fix the first optical lens.

18. The lens assembly according to claim 1, wherein a central axis of the first optical lens module is staggered with respect to a central axis of the second optical lens module by 0 to 15 μm.

19. The lens assembly according to claim 1, wherein a central axis of the first optical lens module is inclined with respect to a central axis of the second optical lens module by an angle of less than 0.5°.

20. The lens assembly according to claim 1, wherein when the first optical lens module and the second optical lens module are assembled together, the first optical lens module and the second optical lens module are arranged in sequence along a same optical axis direction.

21. The lens assembly according to claim 1, wherein when the first optical lens module and the second optical lens module are assembled together, an optical axis direction of the first optical lens module is parallel to an optical axis direction of the second optical lens module.

22. The lens assembly according to claim 1, wherein at least one of the number of the first optical lens modules and the number of the second optical lens modules is two or more.

23. A camera lens module having a lens assembly, comprising:
 the lens assembly according to claim 1; and
 a photosensitive chip, wherein the lens assembly is located in a light path of the photosensitive chip and adjusted, based on image information captured by the photosensitive chip, by means of active calibration.

* * * * *